(12) United States Patent
Zhang et al.

(10) Patent No.: US 11,436,438 B1
(45) Date of Patent: Sep. 6, 2022

(54) TABULAR DATA GENERATION FOR MACHINE LEARNING MODEL TRAINING SYSTEM

(71) Applicant: SAS Institute Inc., Cary, NC (US)

(72) Inventors: Ruiwen Zhang, Cary, NC (US); Weichen Wang, Cary, NC (US); Jorge Manuel Gomes da Silva, Durham, NC (US); Ye Liu, Morrisville, NC (US); Hamoon Azizsoltani, Raleigh, NC (US); Prathaban Mookiah, San Diego, CA (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/559,735

(22) Filed: Dec. 22, 2021

Related U.S. Application Data

(60) Provisional application No. 63/185,850, filed on May 7, 2021.

(51) Int. Cl.
*G06K 9/62* (2022.01)
*G06N 3/04* (2006.01)

(52) U.S. Cl.
CPC .......... *G06K 9/6257* (2013.01); *G06N 3/0454* (2013.01)

(58) Field of Classification Search
CPC ........................... G06K 9/6257; G06N 3/0454
USPC ........................................................ 706/12
See application file for complete search history.

(56) References Cited

U.S. PATENT DOCUMENTS

| | | | | |
|---|---|---|---|---|
| 6,529,891 | B1* | 3/2003 | Heckerman | G06K 9/6296 |
| | | | | 707/999.107 |
| 2020/0183047 | A1* | 6/2020 | Denli | G06F 17/18 |
| 2020/0410273 | A1* | 12/2020 | Miao | G06V 10/255 |
| 2021/0019551 | A1* | 1/2021 | Yan | G06K 9/6267 |
| 2022/0036539 | A1* | 2/2022 | Brauer | G06T 7/0004 |
| 2022/0058444 | A1* | 2/2022 | Olabiyi | G06K 9/6257 |

OTHER PUBLICATIONS

Lin, "Pacgan: The power of two samples in generative adversarial networks" published in In Advances in Neural Information Processing Systems, in 2018. (Year: 2018).*

(Continued)

*Primary Examiner* — Juan A Torres
(74) *Attorney, Agent, or Firm* — Bell & Manning, LLC

(57) ABSTRACT

(A) Conditional vectors are defined. (B) Latent observation vectors are generated using a predefined noise distribution function. (C) A forward propagation of a generator model is executed with the conditional vectors and the latent observation vectors as input to generate an output vector. (D) A forward propagation of a decoder model of a trained autoencoder model is executed with the generated output vector as input to generate a plurality of decoded vectors. (E) Transformed observation vectors are selected from transformed data based on the defined plurality of conditional vectors. (F) A forward propagation of a discriminator model is executed with the transformed observation vectors, the conditional vectors, and the decoded vectors as input to predict whether each transformed observation vector and each decoded vector is real or fake. (G) The discriminator and generator models are updated and (A) through (G) are repeated until training is complete.

30 Claims, 15 Drawing Sheets
(5 of 15 Drawing Sheet(s) Filed in Color)

(56) References Cited

OTHER PUBLICATIONS

Torfi, A., and Fox, E. A. (2020). "CorGAN: Correlation-Capturing Convolutional Generative Adversarial Networks for Generating Synthetic Healthcare Records." Paper presented at the Thirty-Third International FLAIRS Conference (FLAIRS-33). https://www.aaai.org/ocs/index.php/FLAIRS/FLAIRS20/paper/viewFile/18458/17611.
Kingma et al., "ADAM: A Method for Stochastic Optimization," Published as a conference paper at ICLR 2015, arXiv:1412.6980v9 [cs.LG] Jan. 30, 2017.
Vaswani et al., "Attention is All You Need," $31^{st}$ Conference on Neural Information Processing (NIPS 2017), Long Beach, CA.
Zhao et al.,j "CTANB-GAN: Effective Table Data Synthesizing," KDD, 2021, Singapore, arXiv:2102.08369v2 [cs.LG] May 31, 2021.
Gulrajani et al., "Improved training of Wasserstein GANs," arXiv:704.00028v3 [cs.LG] Dec. 25, 2017.
Xu et al., "Modeling Tabular Data using Conditional GAN," $33^{rd}$ Conference on Neural Information Processing Systems (NeurIPS 2019), Vancouver, Canada, arXiv:1907.00503v2 [cs.LG] Oct. 28, 2019.

\* cited by examiner

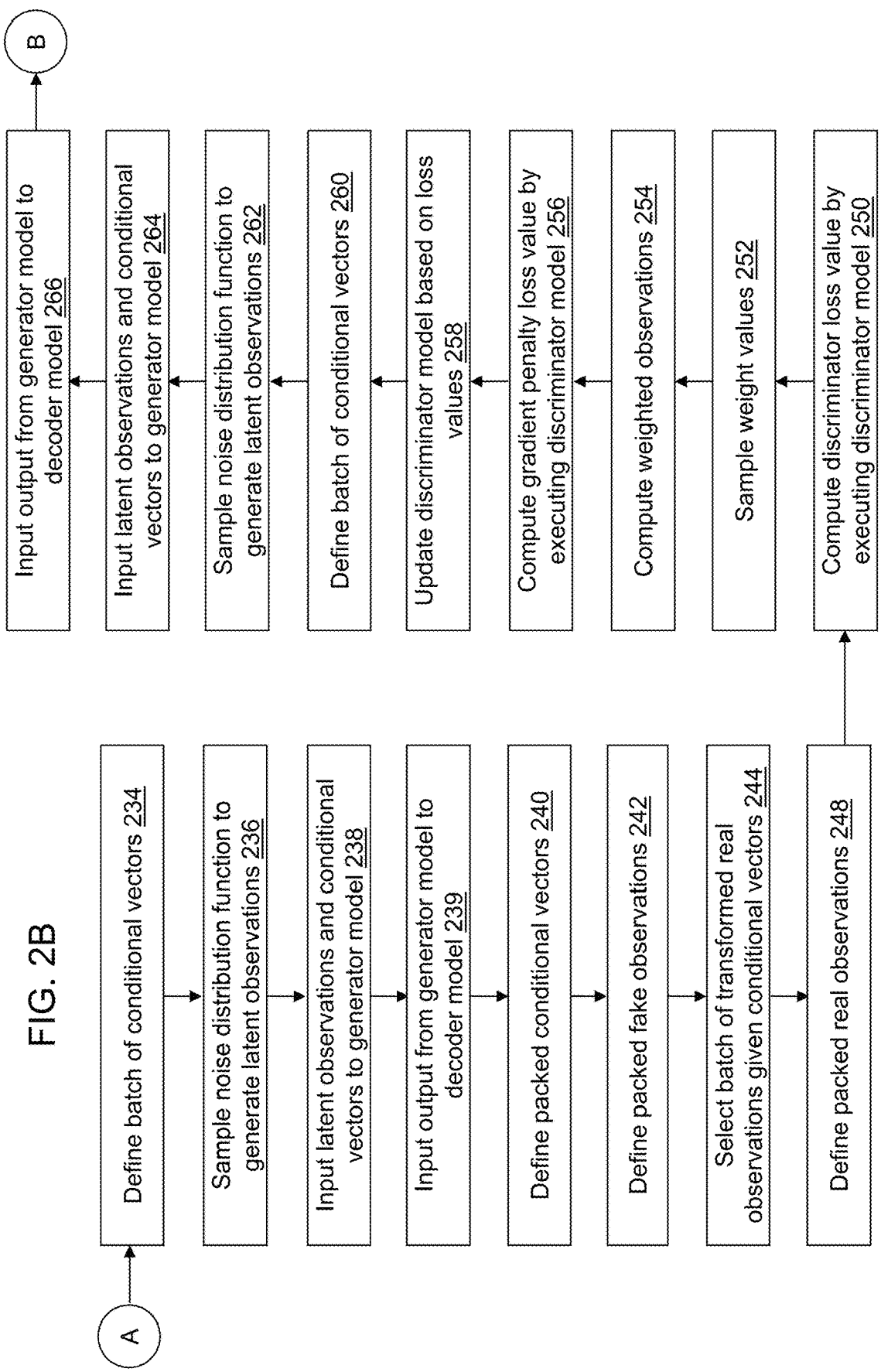

TABULAR DATA GENERATION FOR MACHINE LEARNING MODEL TRAINING SYSTEM

CROSS-REFERENCE TO RELATED APPLICATIONS

The present application claims the benefit of and priority under 35 U.S.C. § 119(e) to U.S. Provisional Pat. Application No. 63/185,850 filed on May 7, 2021, the entire contents of which are hereby incorporated by reference.

BACKGROUND

Machine learning defines models that can be used to predict a target variable value that may indicate occurrence of an event, an observation classification, etc. Tabular data includes variable values for a plurality of variables, where each variable indicates a different feature value associated with the respective observation vector. Tabular data is captured and used to train a machine learning model to make the prediction. In general, the more tabular data is used to train the model, the better the expected model performance in predicting the target variable value. However, in some cases, tabular data is difficult or expensive to capture. In other cases, data privacy is an issue. Synthetic data generation provides a solution that can inexpensively create new data anonymously to improve data privacy. The created new data can be shared for analysis and modeling while providing additional privacy protections. Generating statistically realistic synthetic data poses a number of complex issues such as how to preserve a pairwise correlation between the plurality of variables.

SUMMARY

In an example embodiment, a non-transitory computer-readable medium is provided having stored thereon computer-readable instructions that, when executed by a computing device, cause the computing device to generate synthetic tabular data for use in training a machine learning model. (A) A plurality of conditional vectors is defined. The plurality of conditional vectors includes a predefined number of vectors. Each conditional vector of the plurality of conditional vectors includes a vector defined for each discrete variable of a plurality of variables. (B) A plurality of latent observation vectors is generated using a predefined noise distribution function. The plurality of latent observation vectors includes the predefined number of vectors. Each latent observation vector of the plurality of latent observation vectors includes a first value for each variable of the plurality of variables. (C) A forward propagation of a generator model is executed with the defined plurality of conditional vectors and the generated plurality of latent observation vectors as input to generate an output vector. (D) A forward propagation of a decoder model of a trained autoencoder model is executed with the generated output vector as input to generate a plurality of decoded vectors. The plurality of decoded vectors includes the predefined number of vectors. (E) A plurality of transformed observation vectors is selected from transformed data based on the defined plurality of conditional vectors. The plurality of transformed observation vectors includes the predefined number of vectors. Each transformed observation vector of the plurality of transformed observation vectors is a transformation of a respective observation vector of a plurality of observation vectors included in an input dataset. Each observation vector of the plurality of observation vectors includes a second value for each variable of the plurality of variables. (F) A forward propagation of a discriminator model is executed with the selected plurality of transformed observation vectors, the defined plurality of conditional vectors, and the generated plurality of decoded vectors as input to predict whether each of the selected plurality of transformed observation vectors and the generated plurality of decoded vectors is real or fake. (G) A discriminator model loss value is computed based on whether the prediction for each of the selected plurality of transformed observation vectors and the generated plurality of decoded vectors is correct. (H) The discriminator model is updated using the computed discriminator model loss value. (I) A generator model loss value is computed based on whether the prediction for each of the plurality of transformed observation vectors and the generated plurality of decoded vectors is correct. (J) The generator model is updated using the computed generator model loss value. (A) through (J) are repeated until a convergence parameter value indicates that training of the generator model is complete. A description of the generator model and the decoder model of the trained autoencoder model is output as a trained generator model.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to generate synthetic tabular data for use in training a machine learning model.

In an example embodiment, a method of generating synthetic tabular data for use in training a machine learning model is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIGS. 2A through 2C depict a flow diagram illustrating examples of operations performed by a data generation training application of the data generation training device of FIG. 1 in accordance with an illustrative embodiment.

DETAILED DESCRIPTION

To train machine learning models to provide accurate target variable value predictions, the synthetic data used to train the machine learning models should accurately represent the observations included in input tabular data 124 that may include continuous as well as discrete variables with widely varying statistical distributions. The observations included in input tabular data 124 further may include high cardinality variables and exhibit a high degree of sparsity. A data generation training application 122 generates synthetic data in which the pairwise correlation between variables is more accurate than using existing methods as shown by results described herein. data generation training application 122 provides a data generation model training process based on a combination of a conditional generative adversarial network (GAN) with an autoencoder (AE).

An architecture implemented using data generation training application 122 includes a conditional generator model and a discriminator model. The conditional generator model solves the problem of imbalanced categorical data that is common in real tabular data. More specifically, the conditional generator model samples such that all of the categories from discrete attributes are sampled evenly during the training process so that during the testing process, the real data distribution is accurately reproduced. The discriminator model classifies a data point as either real (drawn from input tabular data 124) or fake (generated). Fake is also referred to as synthetic herein. The architecture implemented using data generation training application 122 further includes an AE trained to understand the pairwise correlations in the real data and to preserve the pairwise correlation in a lower dimensional feature space. The conditional generator is integrated with the decoder model of the trained AE.

Figure 1:
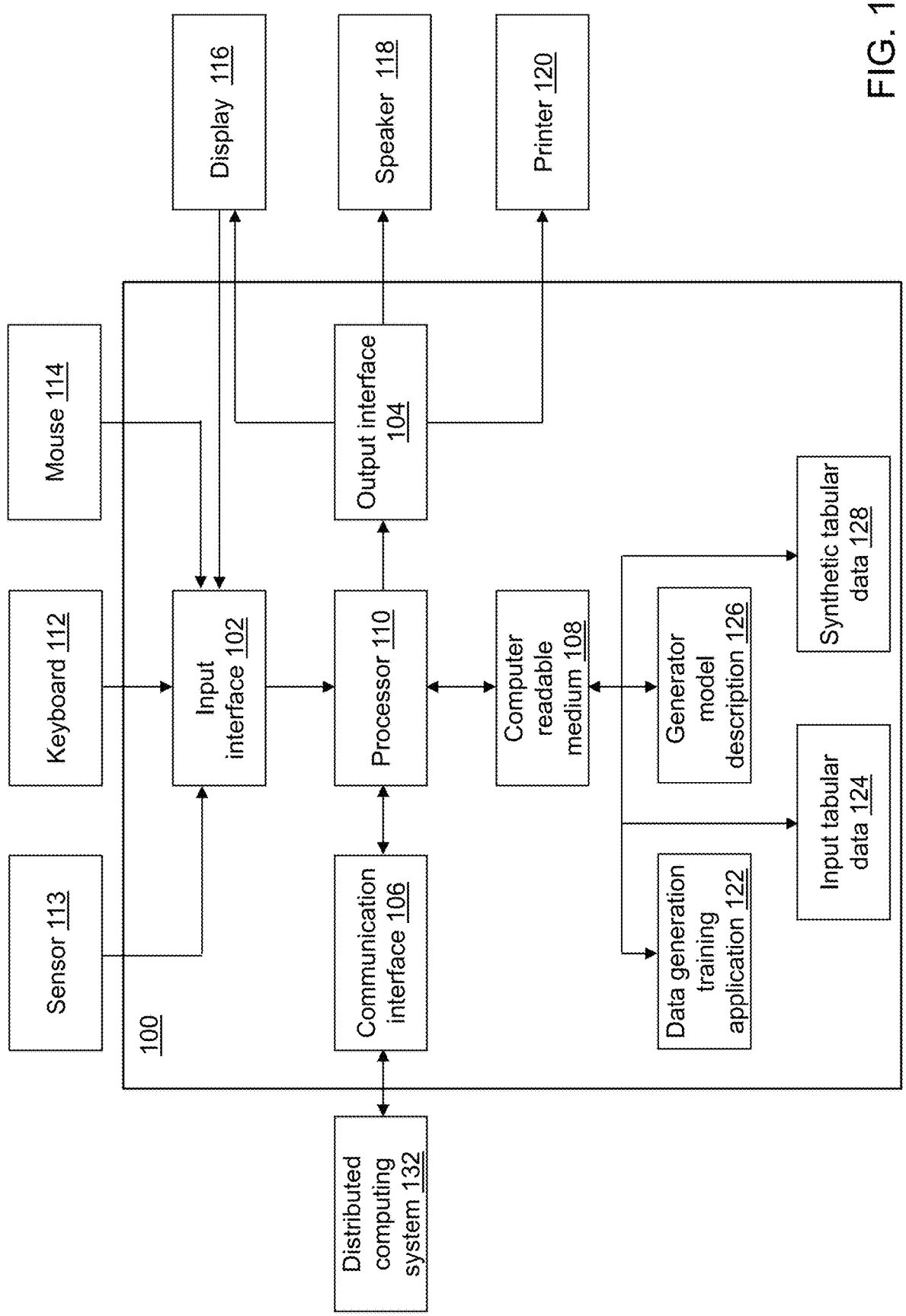
FIG. 1 depicts a block diagram of a data generation training device in accordance with an illustrative embodiment.

Referring to FIG. 1, a block diagram of a data generation training device 100 is shown in accordance with an illustrative embodiment. Data generation training device 100 may include an input interface 102, an output interface 104, a communication interface 106, a non-transitory computer-readable medium 108, a processor 110, data generation training application 122, input tabular data 124, a generator model description 126, and synthetic tabular data 128. Data generation training application 122 trains a generator model with decoder model and a discriminator model to create data stored in synthetic tabular data 128 from data stored in input tabular data 124. Fewer, different, and/or additional components may be incorporated into data generation training device 100.

Input interface 102 provides an interface for receiving information from the user or another device for entry into data generation training device 100 as understood by those skilled in the art. Input interface 102 may interface with various input technologies including, but not limited to, a keyboard 112, a sensor 113, a mouse 114, a display 116, a track ball, a keypad, one or more buttons, etc. to allow the user to enter information into data generation training device 100 or to make selections presented in a user interface displayed on display 116.

The same interface may support both input interface 102 and output interface 104. For example, display 116 comprising a touch screen provides a mechanism for user input and for presentation of output to the user. Data generation training device 100 may have one or more input interfaces that use the same or a different input interface technology. The input interface technology further may be accessible by data generation training device 100 through communication interface 106.

Output interface 104 provides an interface for outputting information for review by a user of data generation training device 100 and/or for use by another application or device. For example, output interface 104 may interface with various output technologies including, but not limited to, display 116, a speaker 118, a printer 120, etc. Data generation training device 100 may have one or more output interfaces that use the same or a different output interface technology. The output interface technology further may be accessible by data generation training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Data generation training device 100 may have one or more communication interfaces that use the same or a different communication interface technology. For example, data generation training device 100 may support communication using an Ethernet port, a Bluetooth antenna, a telephone jack, a USB port, etc. Data and/or messages may be transferred between data generation training device 100 and another computing device of a distributed computing system 132 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Data generation training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Data generation training device 100 also may have one or more drives that support the loading of a memory media such as a CD, DVD, an external hard drive, etc. One or more external hard drives further may be connected to data generation training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Data generation training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Data generation training application 122 may perform operations associated with training an AE, a generator model with a decoder model, and a discriminator model to generate fake or synthetic observation vectors from data stored in input tabular data 124. Some or all of the operations described herein may be embodied in data generation training application 122. The operations may be implemented using hardware, firmware, software, or any combination of these methods.

Referring to the example embodiment of FIG. 1, data generation training application 122 is implemented in software (comprised of computer-readable and/or computer-executable instructions) stored in computer-readable medium 108 and accessible by processor 110 for execution of the instructions that embody the operations of data generation training application 122. Data generation training application 122 may be written using one or more programming languages, assembly languages, scripting languages, etc. Data generation training application 122 may be integrated with other analytic tools. As an example, data generation training application 122 may be part of an integrated data analytics software application and/or software architecture such as that offered by SAS Institute Inc. of Cary, N.C., USA. Merely for illustration, data generation training application 122 may be implemented using or integrated with one or more SAS software tools such as Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, and SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Data generation training application 122 may be implemented as a Web application. For example, data generation training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input tabular data 124 may include, for example, a plurality of rows and a plurality of columns. The plurality of rows may be referred to as observation vectors or records (observations), and the columns may be referred to as variables. In an alternative embodiment, input tabular data 124 may be transposed. The plurality of variables defines a vector $x_i$ for each observation vector i=1, 2, . . . , N, where N is a number of the observation vectors included in input tabular data 124. Each observation vector may be defined using one or more continuous variables and/or one or more discrete variables, where $N_c$ is a number of the one or more continuous variables included in input tabular data 124 for each observation vector, and $N_d$ is a number of the one or more discrete variables included in input tabular data 124 for each observation vector.

Input tabular data 124 may or may not include a target variable value $y_i$ for each observation vector that may indicate a label or class or other characteristic defined for a respective observation vector $x_i$ for i=1, 2, . . . , N. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of sensor signal data does or does not represent (i.e., voice, speech, an equipment failure, an intrusion, a terrain feature, etc.), etc.

Input tabular data 124 may include additional variables that are not included in the plurality of variables. One or more variables of the plurality of variables may describe a characteristic of a physical object. For example, if input tabular data 124 include data related to operation of a vehicle, the variables may include a type of vehicle, an oil pressure, a speed, a gear indicator, a gas tank level, a tire pressure for each tire, an engine temperature, a radiator level, etc.

Sensor 113 may measure a physical quantity in an environment to which sensor 113 is associated and generate a corresponding measurement datum that may be associated with a time that the measurement datum is generated. The measurement datum may be stored in input tabular data 124. Illustrative sensors include a pressure sensor, a temperature sensor, a position or location sensor, a voltage sensor, a current sensor, a frequency sensor, a humidity sensor, a dewpoint sensor, etc. that may be mounted to various components used as part of a system.

In data science, engineering, and statistical applications, data often consists of multiple measurements (across sensors, characteristics, responses, etc.) collected across multiple time instances (patients, test subjects, etc.). These measurements may be collected in input tabular data 124 for analysis and processing or streamed to data generation training device 100 as it is generated. Input tabular data 124 may include data captured as a function of time for one or more physical objects. The data stored in input tabular data 124 may be captured at different time points, periodically, intermittently, when an event occurs, etc. Input tabular data 124 may include data captured at a high data rate such as 200 or more observation vectors per second for one or more physical objects. One or more columns of input tabular data 124 may include a time and/or date value. Input tabular data 124 may include data captured under normal and abnormal operating conditions of the physical object.

The data stored in input tabular data 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input tabular data 124 may be generated as part of the Internet of Things (IoT), where things (e.g., machines, devices, phones, sensors) can be connected to networks and the data from these things collected and processed within the things and/or external to the things before being stored in input tabular data 124. For example, the IoT can include sensors in many different devices and types of devices, and high value analytics can be applied to identify hidden relationships and drive increased efficiencies. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input tabular data 124.

The data stored in input tabular data 124 may include any type of content represented in any computer-readable format such as binary, alphanumeric, numeric, string, markup language, etc. The content may include textual information, numeric information, etc. that further may be encoded using various encoding techniques as understood by a person of skill in the art.

Input tabular data 124 may be stored on computer-readable medium 108 or on one or more computer-readable media of distributed computing system 132 and accessed by data generation training device 100 using communication interface 106 and/or input interface 102. Input tabular data 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input tabular data 124 may be stored using various data structures as known to those skilled in the art including one or more files of a file system, a relational database, one or more tables of a system of tables, a structured query language database, etc. on data generation training device 100 or on distributed computing system 132.

Data generation training device 100 may coordinate access to input tabular data 124 that is distributed across distributed computing system 132 that may include one or more computing devices. For example, input tabular data 124 may be stored in a cube distributed across a grid of computers as understood by a person of skill in the art. As another example, input tabular data 124 may be stored in a multi-node Hadoop® class. For instance, Apache™ Hadoop® is an open-source software framework for distributed computing supported by the Apache Software Foundation. As another example, input tabular data 124 may be stored in a cloud of computers and accessed using cloud computing technologies, as understood by a person of skill in the art. The SAS® LASR Tm Analytic Server may be used as an analytic platform to enable multiple users to concurrently access data stored in input tabular data 124. The SAS Viya open, cloud-ready, in-memory architecture also may be used as an analytic platform to enable multiple users to concurrently access data stored in input tabular data 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
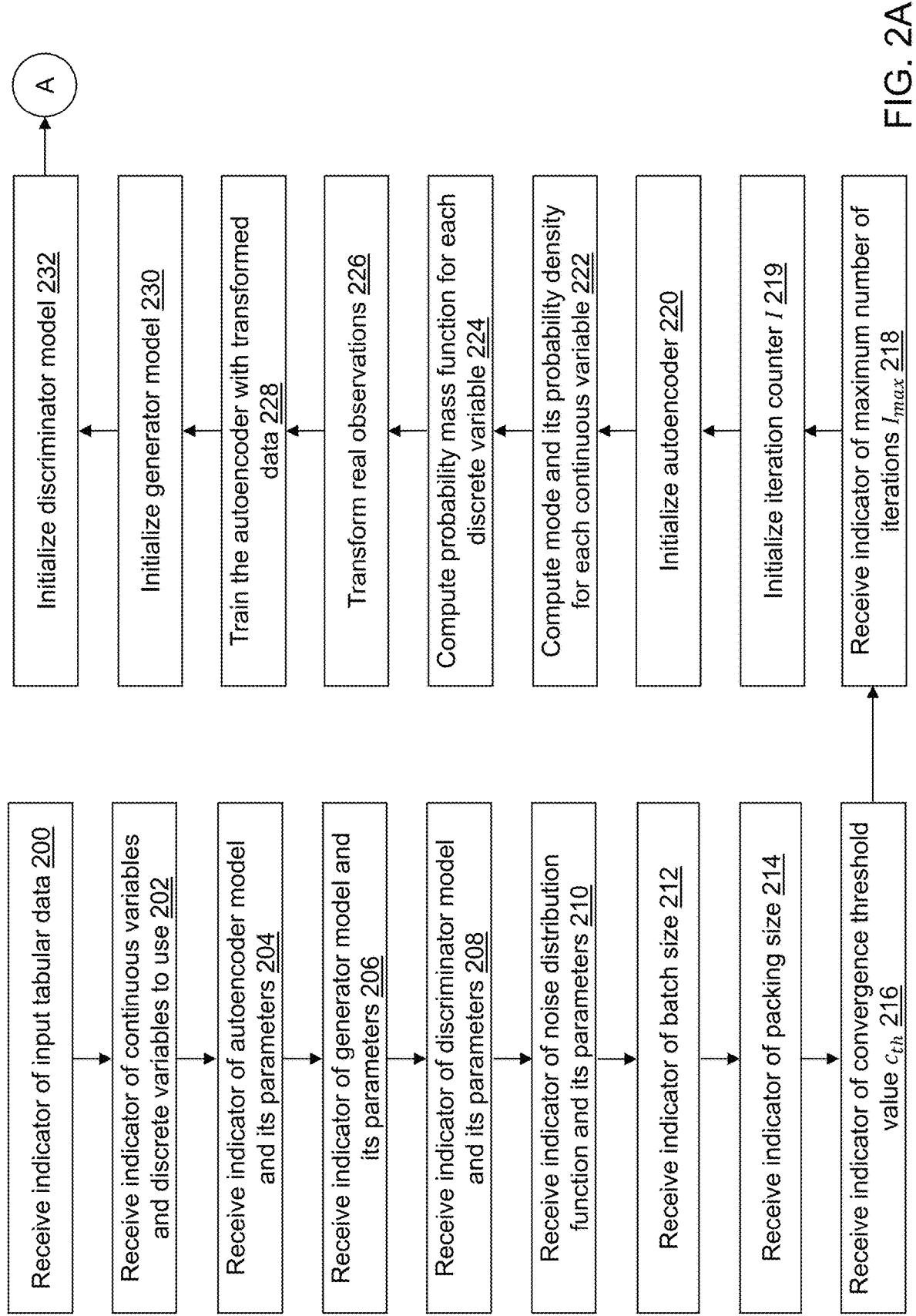
Figure 2C:
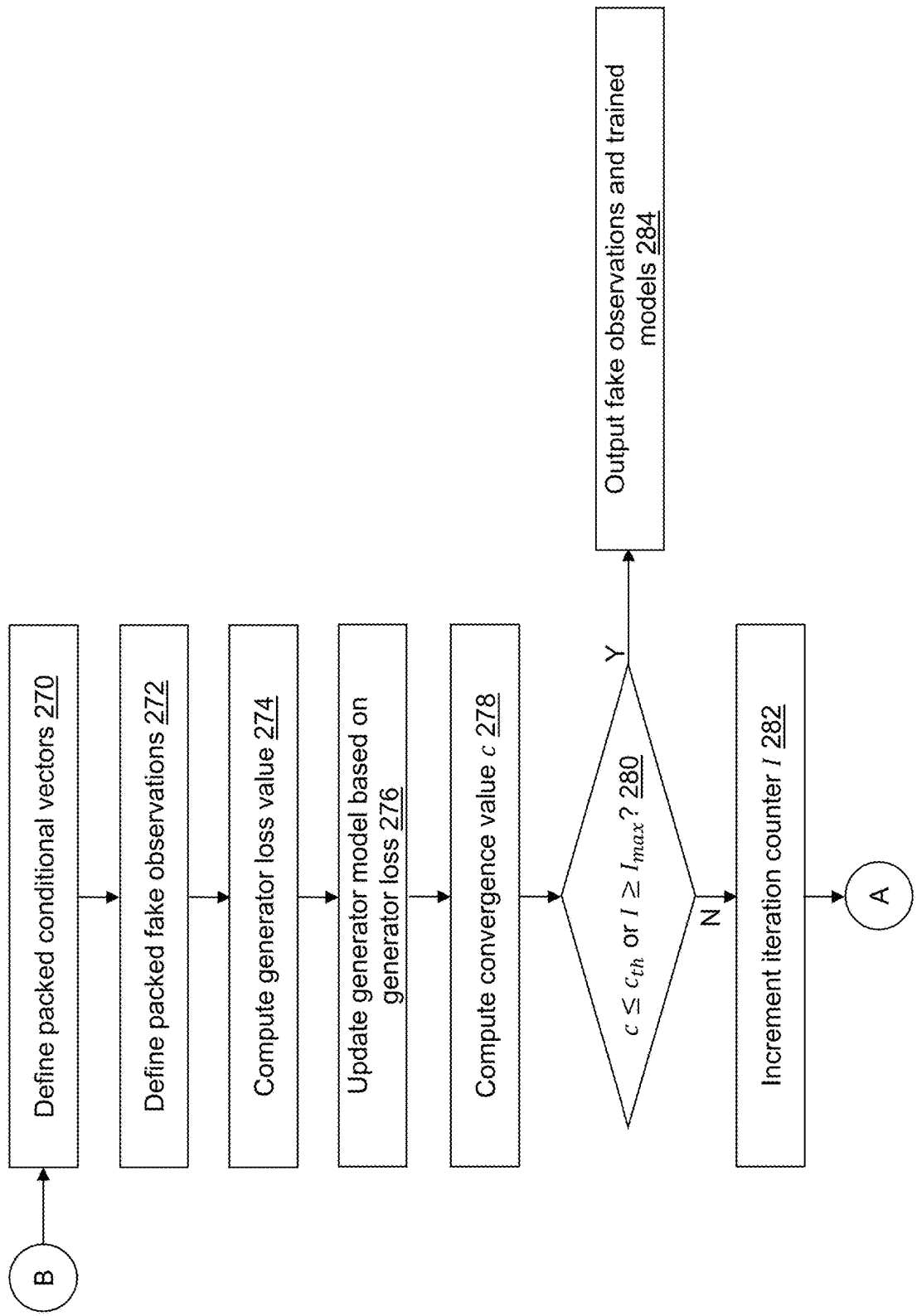

Referring to FIGS. 2A through 2C, example operations associated with data generation training application 122 are described. Additional, fewer, or different operations may be performed depending on the embodiment of data generation training application 122. The order of presentation of the operations of FIGS. 2A through 2C is not intended to be limiting. Some of the operations may not be performed in some embodiments. Although some of the operational flows are presented in sequence, the various operations may be performed in various repetitions and/or in other orders than those that are illustrated. For example, a user may execute data generation training application 122, which causes presentation of a first user interface window, which may include a plurality of menus and selectors such as drop-down menus, buttons, text boxes, hyperlinks, etc. associated with data generation training application 122 as understood by a person of skill in the art. The plurality of menus and selectors may be accessed in various orders. An indicator may indicate one or more user selections from a user interface, one or more data entries into a data field of the user interface, one or more data items read from a command line, one or more data items read from computer-readable medium 108, or one or more data items otherwise defined with one or more default values, etc. that are received as an input by data generation training application 122. Some of the operational flows further may be performed in parallel, for example, using a plurality of threads and/or a plurality of computing devices such as may be included in distributed computing system 132.

Referring to FIG. 2A, in an operation 200, a first indicator may be received that indicates input tabular data 124. For example, the first indicator indicates a location and a name of input tabular data 124. As an example, the first indicator may be received by data generation training application 122 after selection from a user interface window or after entry by a user into a user interface window. In an alternative embodiment, input tabular data 124 may not be selectable. For example, a most recently created dataset may be used automatically.

In an operation 202, a second indicator may be received that indicates the plurality of variables to use from input tabular data 124 to define observation vectors. A data type such as nominal, interval, categorical, etc. may further be defined for each variable of the plurality of variables. For example, the second indicator may indicate one or more column numbers or one or more column names with a data type defined for each. The plurality of variables are the variables that define each observation vector $x_i$, where $x_i = x_{i,j}$, $j=1, \ldots, N_v$. $x_{i,j}$ is a $j^{th}$ variable value for the $i^{th}$ observation vector $x_i$. A number of the plurality of variables may be indicated by $N_v$. The second indicator may further indicate a column number or a column name that stores the value for $y_i$ in input tabular data 124. Based on the data type, each variable of the plurality of variables may be indicated as either a continuous variable or a discrete variable. The one or more continuous variables and the one or more discrete variables are each included in the plurality of variables such that $N_v = N_c + N_d$.

In an operation 204, a third indicator indicates an architecture of an AE model and its parameters, where the parameters include hyperparameters and model training parameters. For illustration, the AE model may be a neural network model to be trained to compress observation vectors into a reduced dimension feature space and to decompress the compressed observation vectors back to an input feature space while preserving the correlation between the plurality of variables. The third indicator may be received by data generation training application 122 from a user interface window or after entry by a user into a user interface window. A default value for the architecture may further be stored, for example, in computer-readable medium 108.

For illustration, the AE model architecture defines a plurality of layers and their connectivity including a type of each layer. Illustrative layers include an input layer, a convolution layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters for training the neural network. The architecture may define a convolutional neural network, a deep, fully connected neural network, and/or a recurrent neural network.

For illustration, the AE model may be a fully connected feed-forward neural network that includes of a five-layer deep neural network for both the encoder and the decoder. For the encoder, each layer is fully connected and uses a linear activation function following by a batch normalization. The encoder reduces the dimensionality of the input data to preserve the correlation between variables. The decoder reverses the process of the encoder and reconstructs the input data. In the illustrative fully-connected feed-forward network, any hidden node in the hidden layers gets input from all of the original features so that each hidden node can obtain information globally. The depth of the network was set to five so that the framework can be generalized to any type of tabular data varying not only in dimension but also in type of relationship, such as a non-linear correlation.

For illustration, the autoencoder model may be described based on the following layers:

$e_0 = \text{Dropout}(\text{BN}(\text{ELU}((\text{FC}_{|r| \to k_0}(r))))), p=0.1)$ $e_1 = \text{Dropout}(\text{BN}(\text{ELU}(\text{FC}_{k_0 \to 0.5k_0}(h_0)))), p=0.1)$ $e_2 = \text{Dropout}(\text{BN}(\text{ELU}((\text{FC}_{0.5k_0 \to 0.25k_0}(h_1))))), p=0.1)$ $e_3 = \text{Dropout}(\text{BN}(\text{ELU}((\text{FC}_{0.25k_0 \to 0.125k_0}(h_2))))), p=0.1)$ $e_4 = \tanh(\text{FC}_{0.125k_0 \to k_1}(h_3))$ $d_0 = \text{Dropout}(\text{BN}(\text{ELU}((\text{FC}_{k_1 \to 0.125k_0}(e_4))))), p=0.1)$ $d_1 = \text{Dropout}(\text{BN}(\text{ELU}((\text{FC}_{0.125k_0 \to 0.25k_0}(d_0))))), p=0.1)$ $d_2 = \text{Dropout}(\text{BN}(\text{ELU}((\text{FC}_{0.25k_0 \to 0.5k_0}(d_1))))), p=0.1)$ $d_3 = \text{Dropout}(\text{BN}(\text{ELU}((\text{FC}_{0.5k_0 \to k_0}(d_2))))), p=0.1)$ $\hat{\alpha}_i = \tanh(\text{FC}_{k_0 \to 1}(d_3))\ 1 \leq i \leq N_c$ $\hat{\beta}_i = \text{gumbel}_{0.2}(\text{FC}_{k_0 \to m_i}(d_3))\ 1 \leq i \leq N_c$ $\hat{d}_i = \text{gumbel}_{0.2}(\text{FC}_{k_0 \to |D_i|}(d_3))\ 1 \leq i \leq N_d$ where r indicates transformed observation vectors input to the autoencoder model, $\text{FC}_{u \to w}$ indicates application of a linear transformation applied to the provided input parameter on a u-dimension input to obtain a w-dimension output, $k_0$ is a maximum dimension value, $k_1$ is a minimum dimension value, | | indicates a number of entries in the identified vectors such as r and $D_i$, BN indicates a batch normalization activation function layer applied to the provided input parameter, ELU indicates an exponential linear activation function layer applied to the provided input parameter, Dropout indicates a dropout layer applied to the provided input parameter that simulates a sparse activation from a given layer such that nodes are randomly dropped during training with a probability defined by a parameter p, tan h indicates a hyperbolic tangent activation function layer applied to the provided input parameter, $\text{gumbel}_{0.2}$ (v) indicates application of a Gumbel softmax on a vector v with a parameter $\tau = 0.2$, $m_i$ is a number of modes defined for an $i^{th}$ continuous variable, and $D_i$ indicates a vector of unique values of an $i^{th}$ discrete variable. Fully connected layers are those layers where all the inputs from one layer are connected to every activation unit of the next layer.

Layers $e_0$ through $e_4$ are associated with an encoder of the AE model, and layers $d_0$ through $d_3$, $\hat{\alpha}_i$, $\hat{\beta}_i$, $i=1, \ldots, N_c$, and $\hat{d}_i$, $i=1, \ldots, N_d$ may be referred to as a decoder of the AE model. $\hat{\alpha}_i$, $\hat{\beta}_i$, $i=1, \ldots, N_c$, and $\hat{d}_i$, $i=1, \ldots, N_d$ define an output space of synthetic encoded observation vectors and a transformation of the decoded vector $d_3$. A last layer of the AE model may use the Gumbel softmax function to normalize an output to a probability distribution over the possible values. $\hat{\alpha}_i$ and $\hat{\beta}_i$ are the output values for each continuous variable, where $\hat{\alpha}_i$ is a scalar and $\hat{\beta}_i$ is a selected mode vector, and $\hat{d}_i$ is a one-hot vector representation of an output value computed for each discrete variable. The output of the AE model is a concatenation of $\hat{\alpha}_i$, $\hat{\beta}_i$, $i=1, \ldots, N_c$ for each continuous variable and $\hat{d}_i$, $i=1, \ldots, N_d$ for each discrete variable. The input to the autoencoder model is a concatenation of the transformed observation vectors r defined in an input space based on $\hat{\alpha}_i$, $\hat{\beta}_i$, $i=1, \ldots, N_c$, and $\hat{d}_i$, $i=1, \ldots, N_d$ computed as described further below.

The one-hot vector representation of the output value computed for a discrete variable includes a binary variable defined for each unique value for a respective discrete variable. The one-hot vector representation can be transformed to the discrete value using a lookup table. For example, for a discrete variable value that includes one of three possible color values in the associated discrete variable column, $D_i$=red, green, blue, $|D_i|$=3, and a one-hot vector representation for the discrete variable value of red would be $\hat{d}_i$=[1,0,0]; a one-hot vector representation for the discrete variable value of green would be $\hat{d}_i$=[0,1,0]; and a one-hot vector representation for the discrete variable value of blue would be $\hat{d}_i$32 [0,0,1]. Dummy variable encoding may be used in some embodiments to reduce a length of each one-hot vector representation by one. For example, a one-hot vector representation for the discrete variable value of red may be $\hat{d}_i$=[0,0]; a one-hot vector representation for the discrete variable value of green would be $\hat{d}_i$=[1,0]; and a one-hot vector representation for the discrete variable value of blue would be $\hat{d}_i$=[0,1].

The third indicator may further indicate other hyperparameters for the AE model, such as a value for $\tau$, $k_0$, $k_1$, $p$, as well as an initial weight vector $w_0$ or a methodology by which the initial weight vector $w_0$ is defined. The training parameters for the AE model may be associated with application of gradient descent in updating gradient vectors and weight vectors each iteration, with application of forward and backward propagation, with a loss function, etc. For example, a binary cross-entropy (BCE) loss function may be used to train the AE model:

$$BCE_{loss} = -\frac{1}{N}\sum_{i=1}^{N} r_i \log o_i + (1-r_i)\log(1-o_i),$$

where $r_i$ is an input to an encoder of the AE model, and $o_i$ is an output of the decoder of the AE model.

In an operation 206, a fourth indicator indicates an architecture of a generator model and its parameters, where the parameters include hyperparameters and model training parameters. For illustration, the generator model may be a neural network model to be trained to conditionally generate new observation vectors. The fourth indicator may be received by data generation training application 122 from a user interface window or after entry by a user into a user interface window. A default value for the architecture may further be stored, for example, in computer-readable medium 108.

For illustration, the generator model architecture defines a plurality of layers and their connectivity including a type of each layer. Illustrative layers include an input layer, a convolution layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters for training the neural network. The architecture may define a convolutional neural network, a deep, fully connected neural network, and/or a recurrent neural network For illustration, the generator model may be described based on the following layers:

$h_0 = z \oplus \text{cond}$ $h_1 = h_0 \oplus \text{ReLU}(\text{BN}(\text{FC}_{|cond|+|z|\rightarrow k_2}(h_0)))$ $h_2 = h_1 \oplus \text{ReLU}(\text{BN}(\text{FC}_{|cond|+|z|+k_2\rightarrow k_2}(h_1)))$ $g = \tan h(\text{FC}_{k_2 \rightarrow k_1}(h_2))$ where z indicates a batch of latent observation vectors input to the generator model, cond indicates a batch of conditional vectors input to the generator model, $\oplus$ indicates to concatenate vectors, $k_2$ indicates a generator dimension, and ReLU indicates a rectified linear activation function layer applied to the provided input parameter. The output of the generator model, g, is at the same dimension $k_1$ of the input to the decoder of the autoencoder and replaces $e_4$ when the generator model is connected to a decoder model of the AE model as described further below. Layers $d_0$ through $d_3$ may be referred to as the decoder of the AE model. $\hat{\alpha}_i$, $\hat{\beta}_i$, i=1, ..., $N_c$, and $\hat{d}_i$, i=1, ..., $N_d$ define the output space of synthetic encoded observation vectors and a transformation of the decoded vector $d_3$ computed from g.

The fourth indicator may further indicate other hyperparameters for the generator model as well as an initial weight vector $w_0$ or a methodology by which the initial weight vector $w_0$ is defined. The training parameters for the generator model may be associated with application of gradient descent in updating gradient vectors and weight vectors each iteration, with application of forward and backward propagation, with a loss function, etc.

In an operation 208, a fifth indicator indicates an architecture of a discriminator model and its parameters, where the parameters include hyperparameters and model training parameters. For illustration, the discriminator model may be a neural network model to be trained to recognize whether an input observation vector is real or fake (synthetic). The fifth indicator may be received by data generation training application 122 from a user interface window or after entry by a user into a user interface window. A default value for the architecture may further be stored, for example, in computer-readable medium 108.

For illustration, the discriminator model architecture defines a plurality of layers and their connectivity including a type of each layer. Illustrative layers include an input layer, a convolution layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters for training the neural network. The architecture may define a convolutional neural network, a deep, fully connected neural network, and/or a recurrent neural network.

For illustration, the discriminator model may be described based on the following layers:

$h_0 = r_1 \oplus \ldots \oplus r_{pac} \oplus \text{cond}_1 \oplus \ldots \oplus \text{cond}_{pac}$ $h_1 = \text{Dropout}(\text{leaky}_{0.2}(\text{FC}_{pac|r|+pac|cond|\rightarrow k_0}(h_0)))$ $h_2 = \text{Dropout}(\text{leaky}_{0.2}(\text{FC}_{k_0 \rightarrow k_0}(h_1)))$ $D(\cdot) = \text{FC}_{k_0 \rightarrow 1}(h_2)$ where pac indicates a packing size, $r_{pac}$ indicates a packed input observation vector that is generated by the generator or is a transformed observation vector read from input tabular data 124, and leaky$_{0.2}$ (v) indicates application of a leaky ReLU activation on a vector v with a leaky ratio y=0.2. A last layer D of the discriminator model outputs a label indicating whether the respective observation vector is real or synthetic. In alternative embodiments, the discriminator model may include a fewer or a greater number of layers of different types and may not use packed vectors as input vectors.

The fifth indicator may further indicate other hyperparameters for the discriminator model, such as y, as well as an initial weight vector $w_0$ or a methodology by which the initial weight vector $w_0$ is defined. The training parameters for the discriminator model may be associated with application of gradient descent in updating gradient vectors and weight vectors each iteration, with application of forward and backward propagation, with a loss function, etc.

In an operation 210, a sixth indicator of a noise distribution function may be received. For example, the sixth indicator indicates a name of a noise distribution function. The sixth indicator may be received by data generation training application 122 after selection from a user interface window or after entry by a user into a user interface window. A default value for the noise distribution function may further be stored, for example, in computer-readable medium 108. As an example, a noise function may be selected from "Gaussian", "Uniform", etc. For example, a default noise function may be the Gaussian function. Of course, the noise distribution function may be labeled or selected in a variety of different manners by the user as understood by a person of skill in the art. In an alternative embodiment, the noise distribution function may not be selectable, and a single noise distribution function is implemented in data generation training application 122. For example, the Gaussian function may be used by default or without allowing a selection. With the selection of the noise distribution function, parameters associated with the selected noise function may be provided using the sixth indicator. For example, when Gaussian function is used, a mean and a variance may be provided. In an illustrative embodiment, a Gaussian function with a mean value of zero and a unit value for the variance may be defined and used by default.

In an operation 212, a seventh indicator of a batch size $n_b$ may be received. In an alternative embodiment, the seventh indicator may not be received. For example, a default value may be stored, for example, in computer-readable medium 108 and used automatically. In another alternative embodiment, the value of the batch size $n_b$ may not be selectable. Instead, a fixed, predefined value may be used. For illustration, a default value for the batch size $n_b$ value may be $n_b=4$ though other values may be used.

In an operation 214, an eighth indicator of the packing size pac may be received. In an alternative embodiment, the eighth indicator may not be received. For example, a default value may be stored, for example, in computer-readable medium 108 and used automatically. In another alternative embodiment, the value of the packing size pac may not be selectable. Instead, a fixed, predefined value may be used. For illustration, a default value for the packing size pac may be pac=10 though other values may be used. A ratio value $$q = \frac{n_b}{pac}$$

may be defined.

In an operation 216, a ninth indicator of a convergence threshold value $c_{th}$ may be received. In an alternative embodiment, the ninth indicator may not be received. For example, a default value may be stored, for example, in computer-readable medium 108 and used automatically. In another alternative embodiment, the value of the convergence threshold value $c_{th}$ may not be selectable. Instead, a fixed, predefined value may be used. For illustration, a default value of the convergence threshold value $c_{th}$ may be 0.01 though other values may be used.

In an operation 218, a tenth indicator of a maximum number of iterations $I_{max}$ may be received. In an alternative embodiment, the tenth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 100 though other values may be used.

In an operation 219, an iteration counter I is initialized, for example, as I=1.

In an operation 220, the AE model indicated in operation 204 is initialized. For example, an encoder parameter $\Phi_{enc}$ and a decoder parameter $\Phi_{dec}$ are initialized, the weights of each node are initialized randomly, etc.

In an operation 222, a mode vector $\beta_{i,j}$ and a probability density value $a_{i,j}$ are computed from the observation vectors included in input tabular data 124 for each continuous variable of each observation vector included in input tabular data 124. Each mode vector includes a value for each mode, where $m_i = N_m$, $i=1, \ldots, N_c$ where $N_m$ is a predefined number of modes and a number of entries in each mode vector. One of the values of the mode vector indicates the mode that is selected for the respective observation vector for the respective continuous variable. For continuous variables, a variational Gaussian mixture model is used to compute a probability density $\rho_k = \mu_k \mathcal{N}(C_{i,j}; \eta_k, \phi_k) k=1, \ldots, m_i$ for each mode k, where $\rho_k$ is a $k^{th}$ probability density value, $\mu_k$ is a mean value computed for the $k^{th}$ mode, $\eta_k$ is a mode value computed for the $k^{th}$ mode, $\phi_k$ is a standard deviation value computed for the $k^{th}$ mode, and $c_{i,j}$ indicates an $i^{th}$ continuous variable value for a $j^{th}$ observation vector included in input tabular data 124. For each $i^{th}$ continuous variable value of each $j^{th}$ observation vector, $c_{i,j}$, the probability of that value coming from each mode $m_i$ is $\rho_k = \mu_k \mathcal{N}(C_{i,j}; \eta_k, \phi_k)$, $k=1, \ldots, m_i$. A random sample is made to select a mode $s_m$ for $c_{i,j}$ based on a comparison between the probablity values $\rho_k, k=1, \ldots, m_i$. For example, a random value between zero and one is drawn from a uniform random distribution function that is compared to the ranges defined by $[0, \rho_1)$, $[\rho_1, \rho_1 + \rho_2), \ldots, [\rho m_i - 1, \rho m_i - 1 + \rho m_i]$. The mode $s_m$ is a numerical index to the range within which the drawn random value falls. Once the mode $s_m$ is selected, a one-hot vector $\beta_{i,j}$ is defined for the $i^{th}$ continuous variable value of the $j^{th}$ observation vector to indicate the mode selected such that $\beta_{i,j}$ has zero values except for a one value to indicate the selected mode. For example, if there are three modes and the second mode was selected $s_m=2$ because the drawn random value was in the range $[\rho_1, \rho_1 + \rho_2)$, $\beta_{i,j}=[0,1,0]$. A probability density value $\alpha_{i,j}$ is also computed for the $i^{th}$ continuous variable value of the $j^{th}$ observation vector using $$\alpha_{i,j} = \frac{c_{i,j} - \eta_{s_m}}{4\phi_{s_m}}.$$

The mode value $\beta_{i,j}$ and its associated probability density value $a_{i,j}$ are used to represent a transformed observation vector $x_j$ so that each observation vector $x_j$ can be normalized, where each $x_j, j=1, \ldots, N$ is defined from an observation vector read from input tabular data 124. For example, the mode and its probability density can be computed for each continuous variable as described in section 4.2 of a paper by Lei Xu et al. titled Modeling Tabular Data using Conditional GAN published Oct. 28, 2019 for the 33rd Conference on Neural Information Processing Systems (NeurIPS 2019) also referred to herein as the CT-GAN paper.

In an operation 224, a probability mass function $PMF_i$, $i=1, \ldots, N_d$ is computed from the observation vectors included in input tabular data 124 for each discrete variable of each observation vector included in input tabular data 124 such that the probability mass of each value is a logarithm of its frequency for a respective discrete variable.

In an operation 226, each observation vector included in input tabular data 124 is transformed. For example, $r_j=T(x_j)$, $j=1, \ldots, N$, where T indicates the transformation that indicates that each continuous variable value is replaced with its respective mode value $\beta_{i,j}, i=1, \ldots, N_c; j=1, \ldots, N$ and probability density value $a_{i,j}, i=1, \ldots, N_c; j=1, \ldots, N$ and that each discrete variable value is replaced with its respective one-hot vector representation vector $d_{i,j}$, $i=1, \ldots, N_d$, $j=1, \ldots, N$ so that $r_j = \alpha_{1,j} \oplus \beta_{1,j} \oplus \ldots \oplus \alpha_{N_{c,j}} \oplus \beta N_{c,j} \oplus d_{1,j} \oplus \ldots \oplus d_{N_d,j}, j=1, \ldots, N$.

In an operation 228, the initialized AE model is trained with the transformed observation vectors $r_j = \alpha_{1,j} \oplus \beta_{1,j} \oplus \ldots \oplus \alpha_{N_{c,j}} \oplus \beta N_{c,j} \oplus d_{1,j} \oplus \ldots \oplus d_{N_d,j}, j=1, \ldots, N$ as an input. The AE is optimized, for example, by minimizing the BCE loss function:

$$BCE_{loss} = -\frac{1}{N} \sum_{i=1}^{N} r_i \log o_i + (1-r_i)\log(1-o_i).$$

In an operation 230, the generator model indicated in operation 206 is initialized. For example, a generator parameter $\Phi_G$ is initialized, and the weights of each node are initialized randomly.

In an operation 232, the discriminator model indicated in operation 208 is initialized, and processing continues with an operation 234 shown referring to FIG. 2B. For example, a discriminator parameter $\Phi_D$ is initialized, the weights of each node are initialized randomly, and parameters for each layer are initialized.

In operation 234, a batch size $N_b$ number of conditional vectors cond are defined, for example, as described in Training-by-sampling of section 4.3 of the CT-GAN paper. Each conditional vector $cond_j, j=1, \ldots, N_b$ is a vector of length defined by $N_d$, the number of the one or more discrete variables. For example, to define each conditional vector $cond_j$, $N_d$ zero-filled mask vectors $M_i=[M_i^{(k)}]_{k=1, \ldots, |D_i|}$, $i=1, \ldots, N_d$ are defined. A variable index value i* between one and $N_d$ is randomly selected with equal probability of selecting each value between one and $N_d$. A variable value k* between one and $|D_i|$ is randomly selected using the probability mass function computed for the $i^{*,th}$ discrete variable $k^*=PMF_{i*}$. The $k^{*,th}$ component of $M_{i*}$ is set to one, or $M_{i*}^{(k^*)}=1$. The conditional vector is defined using $cond_j = M_1 \oplus \ldots \oplus M_{N_d}$. The process is repeated to define each conditional vector $cond_j$ in the batch of conditional vectors cond.

In an operation 236, the noise distribution function indicated in operation 210 is sampled to generate a batch size $N_b$ number of latent observation vectors z. A batch of latent observation vectors is generated by sampling the noise distribution function the batch size $N_b$ number of times so that the batch of latent observation vectors includes the batch size $N_b$ number of observation vectors. Each latent observation vector $z_j, j=1, \ldots, N_b$ is a vector of length defined by $N_v$, the number of the plurality of variables that includes the continuous and discrete variables. A target variable value such as $y_j=0, j=1, \ldots, N_b$ may be defined to indicate that each respective latent observation vector $z_j$ is a fake observation vector.

In an operation 238, the batch of latent observation vectors $z_j, j=1, \ldots, N_b$ and the batch of conditional vectors $cond_j, j=1, \ldots, N_b$ are input to the generator model indicated in operation 206 to compute g=G(z, cond), where $G_{(\ )}$ indicates execution of the generator model with the indicated vectors to define g.

In an operation 239, the output of the generator model, g, is input to the decoder model of the trained autoencoder to define $\hat{\alpha}$ and $\hat{\beta}$ for each continuous variable and $\hat{d}$ for each discrete variable. For example, the output of the decoder model is $\hat{r}_j = \hat{\alpha}_{1,j} \oplus \hat{\beta}_{1,j} \oplus \ldots \oplus \hat{\alpha}_{N_{c,j}} \oplus \hat{\beta}_{N_{c,j}} \oplus \hat{d}_{1,j} \oplus \ldots \oplus \hat{d}_{N_d,j}, j=1, \ldots, N_b$.

In an operation 240, packed conditional vectors may be defined. For example, $cond_k^{(pac)} = cond_{k \times pac+1} \oplus \ldots \oplus cond_{k \times pac+pac}$, $k=1, \ldots, q$ as described in a paper by Zinan Lin, Ashish Khetan, Giulia Fanti, and Sewoong Oh titled Pacgan: The power of two samples in generative adversarial networks and published in In Advances in Neural Information Processing Systems, 2018 also referred to herein as the PacGAN paper and as described in Algorithm 1 of the CT-GAN paper.

In an operation 242, packed fake observations $\hat{r}_k^{(pac)}$ may be defined. For example, $\hat{r}_k^{(pac)} = \hat{r}_{k \times pac+1} \oplus \ldots \oplus \hat{r}_{k \times pac+pac}$, $k=1, \ldots, q$ as described in Algorithm 1 of the CT-GAN paper.

In an operation 244, a batch size $N_b$ number of observation vectors are selected from the transformed representation of each observation vector defined in operations 222 and 224 with replacement to define $r_j = Uniform(T(x_j)|cond_j)=1, \ldots, N_b$, where Uniform indicates a uniform random distribution function, T indicates the transformation of operations 222 and 224, $x_j$ is an observation vector selected from input tabular data 124, $(T(x_j)|cond_j)$ indicates a transformed observation vector selected given each respective conditional vector $cond_j$ so that the transformed observation vectors are sampled according to a log-frequency of each category and so all discrete values are explored evenly. The $cond_j = M_1 \oplus \ldots \oplus M_{N_d}$ has a one in a single position of the vector that is associated with a specific value for one of the discrete variables. An observation vector having the specific value indicated by $cond_j$ is selected from $T(x_j)$. For example, a row having the selected discrete variable value k* for the selected variable index value i* is randomly selected from all of the rows that have the selected discrete variable value k* for the selected variable index value i* using a uniform random distribution. A target variable value such as $y_j=1$, $j=1, \ldots, N_b$ may be defined to indicate that each respective real observation vector $r_j$ is a real observation vector.

In an operation 248, packed real observations $r_k^{(pac)}$ may be defined. For example, $r_k^{(pac)} = r_{k \times pac+1} \oplus \ldots \oplus r_{k \times pac+pac}$, $k=1, \ldots, q$ as described in Algorithm 1 of the CT-GAN paper.

In an operation 250, a discriminator loss value $L_D$ is computed by executing the discriminator model with the packed real observations $r_k^{(pac)}$, the packed fake observations $\hat{r}_k^{(pac)}$, and the packed conditional vectors $cond_k^{(pac)}$. For example, $$L_D = \frac{1}{q}\sum_{k=1}^{q} D(\hat{r}_k^{(pac)}, cond_k^{(pac)}) - \frac{pac}{n_b}\sum_{k=1}^{q} D(r_k^{(pac)}, cond_k^{(pac)})$$

as described in Algorithm 1 of the CT-GAN paper, where D( ) indicates execution of the discriminator model with the indicated vectors as input to predict whether each observation vector is real or fake.

In an operation 252, weight values are sampled from a uniform distribution function with values between zero and one. For example, q weight values are defined by sampling using $\rho_k$=Uniform(0,1),k=1, . . . , q.

In an operation 254, weighted observation vectors are computed using the sampled weight values as described in Algorithm 1 of the CT-GAN paper. For example, $\tilde{r}_k^{(pac)} = \rho_k \hat{r}_k^{(pac)} + (1-\rho_k) r_k^{(pac)}$, k=1, . . . , q.

In an operation 256, a gradient penalty loss value is computed. For example, $$L_{GP} = \frac{1}{q}\sum_{k=1}^{q}\left(\left\|\nabla_{\tilde{r}_k^{(pac)}} D(\tilde{r}_k^{(pac)}, cond_k^{(pac)})\right\|_2 - 1\right)^2$$

as described in Algorithm 1 of the CT-GAN paper, where ∇ indicates a gradient computed using backpropagation of the discriminator model with the indicated vectors as input, and $\|\ \|_2$ indicates an L2 norm computation.

In an operation 258, the discriminator model indicated in operation 208 is updated using the discriminator and gradient penalty loss values to compute new weight values for each node. For example, $\Phi_D = \Phi_D - 0.0002 \times \text{Adam}(\nabla_{\Phi_D}(L_D + 10L_{GP}))$, where Adam indicates use of the Adam optimization algorithm with the discriminator gradients $\nabla_{\Phi_D}$ to compute updated weights for each node included in the discriminator model, and 0.0002 indicates a value of a learning rate. Other optimization algorithms, such as stochastic gradient descent (SGD) and other extensions of SGD, other loss values, and other values for the learning rate may be used to update the discriminator model.

Similar to operation 234, in an operation 260, a batch size $N_b$ number of conditional vectors cond are defined for a next batch.

Similar to operation 236, in an operation 262, the noise distribution function indicated in operation 210 is sampled to generate a next batch of latent observation vectors z.

Similar to operation 238, in an operation 264, the batch of latent observation vectors $z_j$,j=1, . . . , $N_b$ and the batch of conditional vectors $cond_j$,j=1, . . . , $N_b$ are input to the generator model indicated in operation 206 to compute g=G(z, cond), where G( ) indicates execution of the generator model with the indicated vectors to define g.

Similar to operation 239, in an operation 266, the output of the generator model, g, is input to the decoder model of the trained autoencoder to define $\hat{\alpha}$ and $\hat{\beta}$ for each continuous variable and $\hat{d}$ for each discrete variable, and processing continues in operation 270 shown referring to FIG. 2C. For example, the output of the decoder model is $\hat{r}_j = \hat{\alpha}_{1,j} \oplus \hat{\beta}_{1,j} \oplus \ldots \oplus \hat{\alpha}_{N_c,j} \oplus \hat{\beta}_{N_c,j} \oplus \hat{d}_{1,j} \oplus \ldots \oplus \hat{d}_{N_d,j}$, j=1, . . . , $N_b$.

Similar to operation 240, in an operation 270, packed conditional vectors $cond_k^{(pac)}$ are defined.

Similar to operation 242, in an operation 272, packed fake observations $\hat{r}_k^{(pac)}$ are defined from the output of operation 266.

In an operation 274, a generator loss value is computed. For example, $$L_G = \frac{1}{q}\sum_{k=1}^{q} D(\hat{r}_k^{(pac)}, cond_k^{(pac)}) \frac{1}{N_b}\sum_{j=1}^{N_b} CrossEntropy(\hat{d}_{i*,j}, M_{i*})$$

as described in section 4.3 and in Algorithm 1 of the CT-GAN paper, where CrossEntropy indicates a cross entropy computation, $\hat{d}_{i*,j}$ is the $i^{*,th}$ discrete variable value selected from $d_{1,j} \oplus \ldots \oplus d_{N_{d_j}}$ defined in operation 266 for the $j^{th}$ conditional vector of the batch, and $M_{i*}$ is the $i^{*,th}$ mask selected from $M_1 \oplus \ldots \oplus M_{N_d}$ defined in operation 260. The second term is added so that the generator model and decoder model make $\hat{d}_{i*,j} = M_{i*}$ so that the generated one-hot encoding vector is equal to the $i^{*,th}$ mask. The cross entropy is a difference measured between the generated one-hot encoded vector and the selected one-hot encoded conditional mask vector.

In an operation 276, the generator model indicated in operation 206 is updated using the generator loss value to compute new weight values for each node. For example, $\Phi_G = \Phi_G - 0.0002 \times \text{Adam}(\nabla_{\Phi_G} L_G)$ as described in Algorithm 1 of the CT-GAN paper though other optimization algorithms, other loss values, other values for the learning rate, etc. may be used to update the generator model.

In an operation 278, a convergence value c is computed. For example, the convergence parameter value c may be computed using $c = L_D + 10L_{Gp} + L_G$.

In an operation 280, a determination is made concerning whether convergence has been achieved or the maximum number of iterations have been performed. If $c \leq c_{th}$ or $I \geq I_{max}$, processing continues in an operation 284. If $c > c_{th}$ and $I < I_{max}$, processing continues in an operation 282.

In operation 282, the iteration counter I is incremented, for example, as I=I+1, and processing continues in operation 234.

In operation 284, the trained generator model with the decoder model of the trained AE model and/or the trained discriminator model may be output. For example, the updated generator model from operation 276 with the decoder model of the trained AE model may be output to generator model description 126. For example, the updated discriminator model from operation 258 may be output to generator model description 126 or another computer storage location. For illustration, the trained generator model with the decoder model of the trained AE model may be stored using the ASTORE procedure provided by SAS® Visual Data Mining and Machine Learning software. For illustration, the trained discriminator model from operation 258 may further be stored using the ASTORE procedure provided by SAS® Visual Data Mining and Machine Learning software and used to predict whether input observations are real or fake.

The synthetic observations may be output to synthetic tabular data 128. Because one-hot encoded values were computed for the continuous and discrete variables, the encoding process is reversed to transform the defined in operation 266 back to an original space defined by the observation vectors included in input tabular data 124. For example, each $\hat{r}_j = \hat{\alpha}_{1,j} \oplus \hat{\beta}_{1,j} \oplus \ldots \oplus \hat{\alpha}_{N_c,j} \oplus \hat{\beta}_{N_c,j} \oplus \hat{d}_{1,j} \oplus \ldots \oplus \hat{d}_{N_d,j}$, j=1, . . . , $N_b$ is transformed to define values for each continuous variable i=1, . . . , $N_c$ and each discrete variable n=1, . . . , $N_d$. For each continuous variable, mode k is defined based on an index to the value that is non-zero in $\hat{\beta}_{i,j}$, i=1, ..., $N_c$ and used to compute the continuous value as $c_{i,j}=4\phi_k\hat{\alpha}_{i,j}+\eta_k$. For each discrete variable, the one-hot vector representation $\hat{d}_{1,j}$ is used to define the discrete value, for example, using a lookup table. For example, based on the illustration above for a discrete variable value that includes one of three possible color values, red, green, blue, in the associated discrete variable column, $\hat{d}_{1,j}=[1,0,0]$ is transformed to the discrete value "red", $\hat{d}_{1,j}=[0,1,0]$ is transformed to the discrete value "green", and $\hat{d}_{1,j}=[0,0,1]$ is transformed to the discrete value "blue". The transformed synthetic observations may be output to synthetic tabular data 128.

To generate synthetic observations from the stored generator model, an indicator of the noise distribution function indicated in operation 210 and $\eta_{k,i}$, k=1, ..., $N_m$, i=1, ..., $N_c$ and $\phi_{k,i}$, k=1, ..., $N_m$, i=1, ..., $N_c$ may be output, for example, to generator model description 126. The $PMF_i$, i=1, ..., $N_d$ may further be output, for example, to generator model description 126. The lookup table for discrete values for each discrete variable may further be output, for example, to generator model description 126.

Figure 3A:
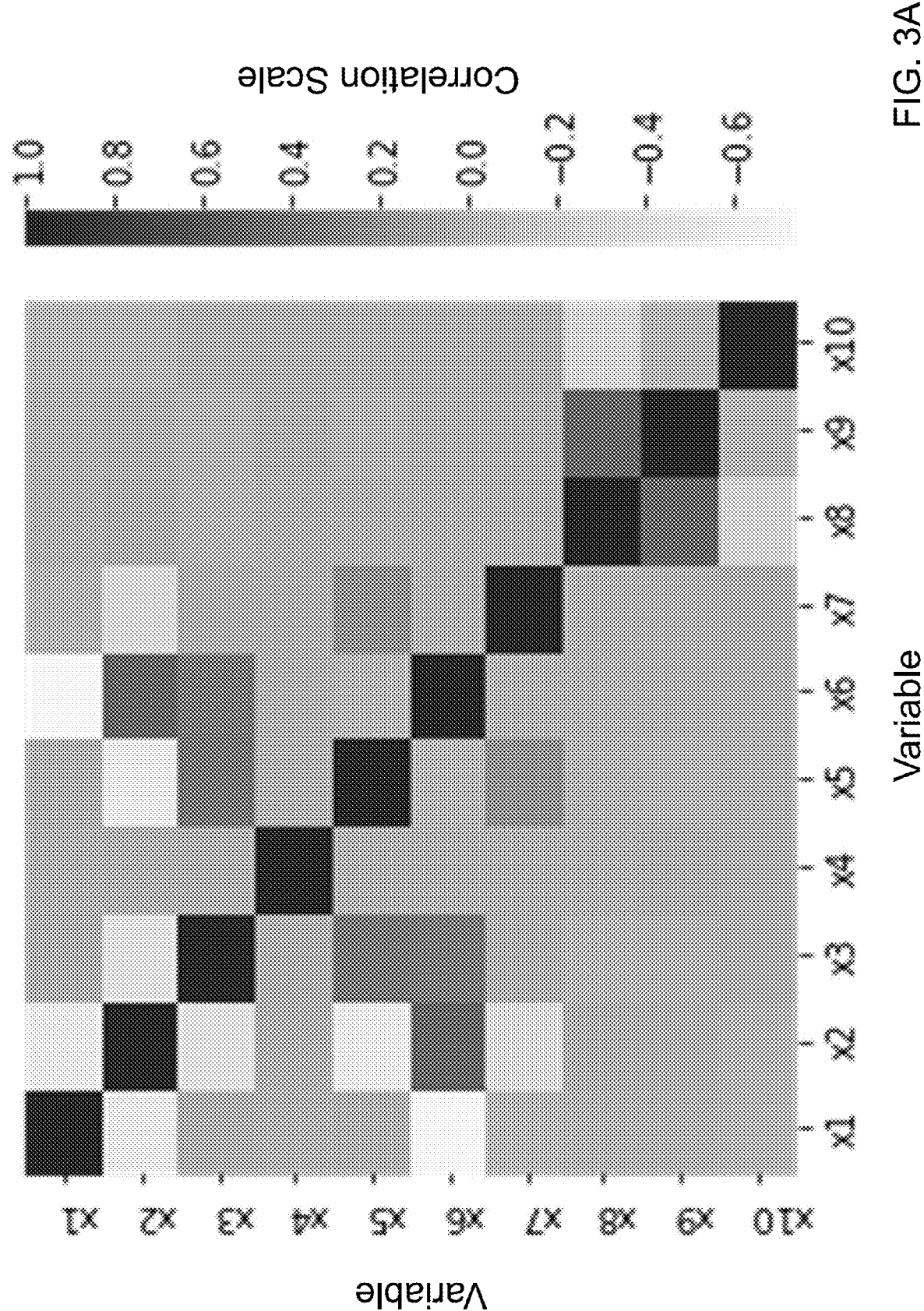
FIGS. 3A to 3E show heatmaps of illustrative correlation results between pairs of variables using different data generation methods in accordance with an illustrative embodiment.
Figure 3B:
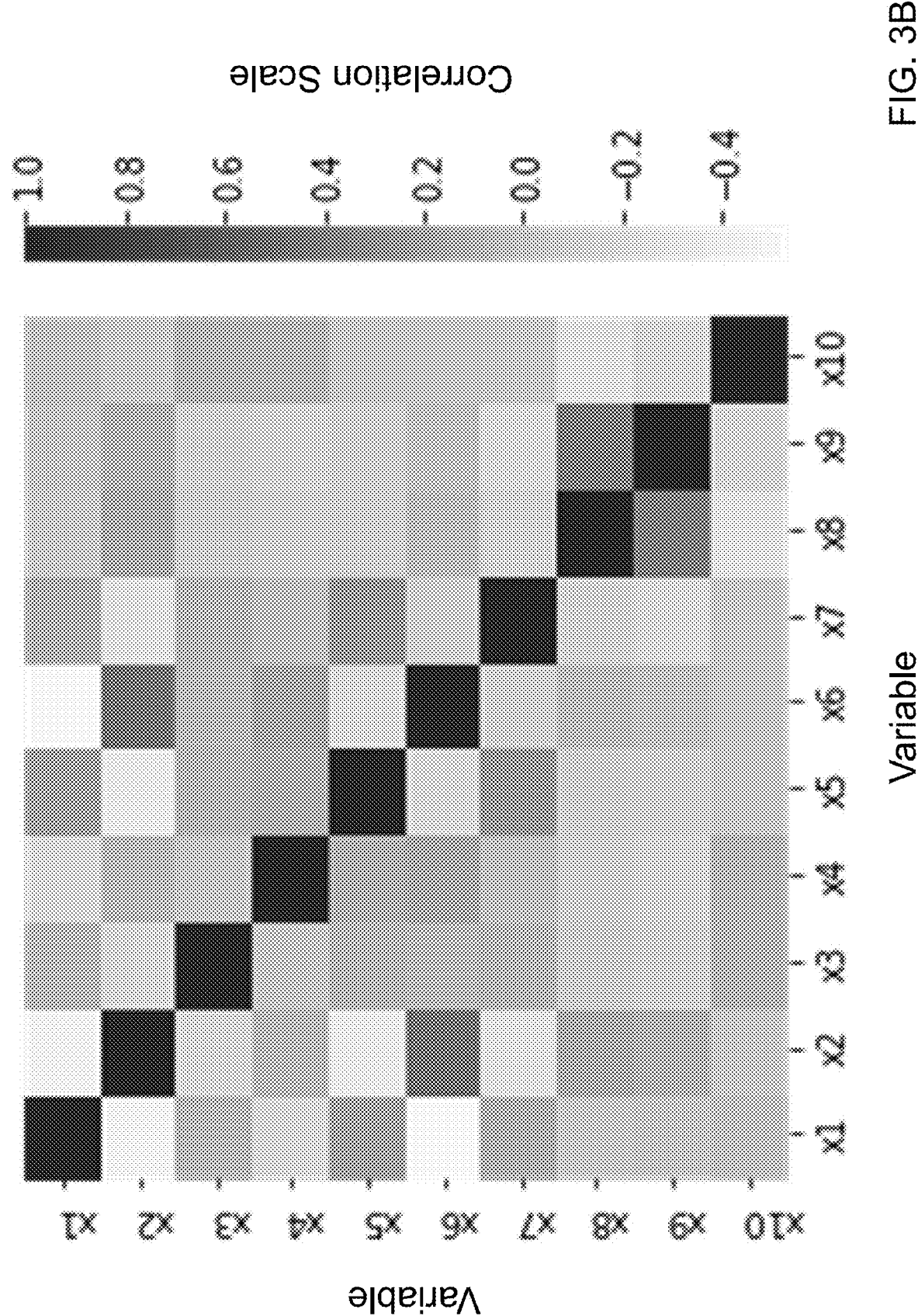
Figure 3C:
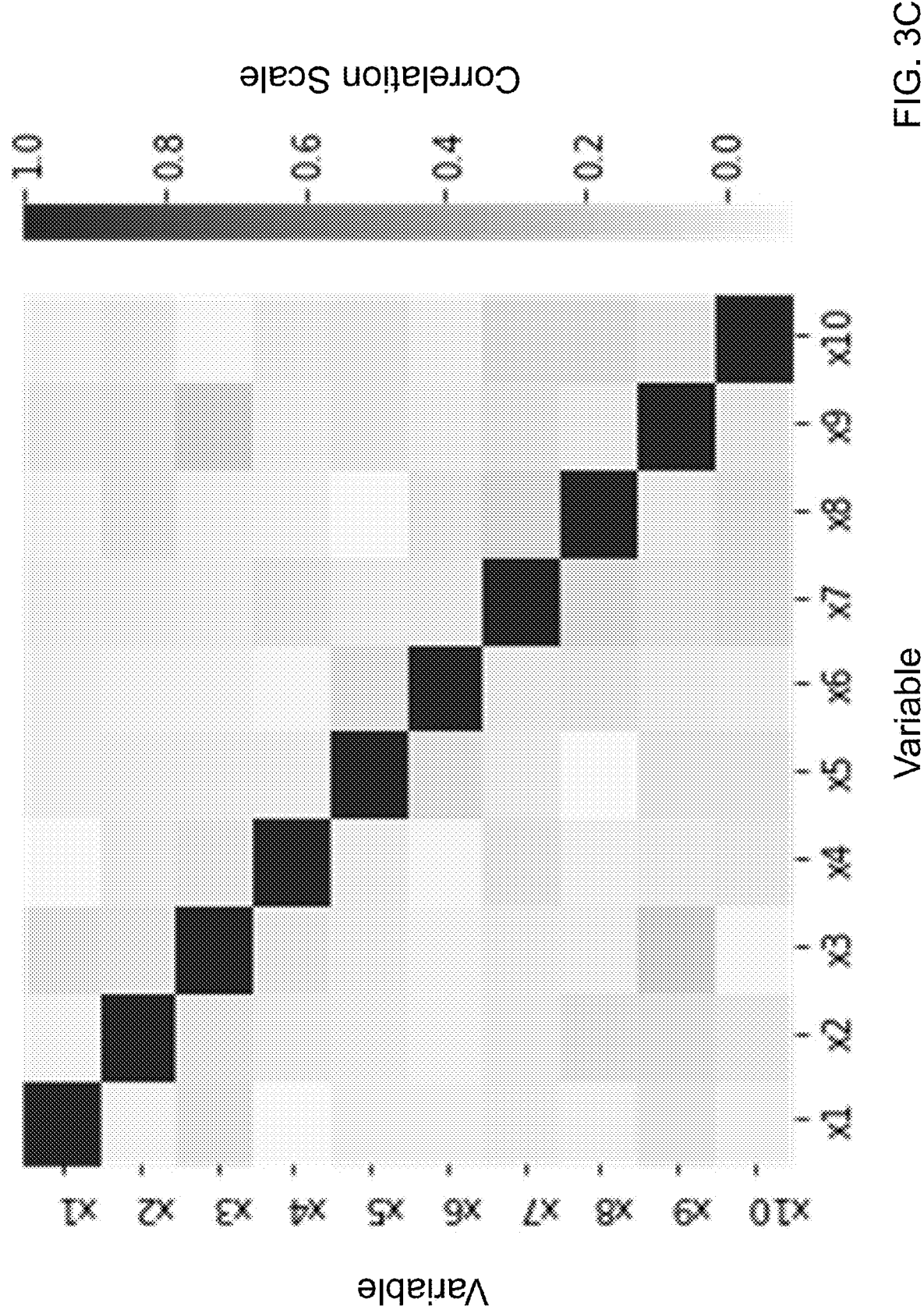

A performance of data generation training application 122 was compared to an existing method CTGAN described in the CT-GAN paper. A simulated dataset was generated with ten numeric variables that were correlated and 10,000 observation vectors. A correlation matrix was defined for the ten variables. The correlation matrix was decomposed with a Cholesky decomposition. The datasets were generated by multiplying the Cholesky component by a random number. Referring to FIG. 3A, a heatmap of the correlation matrix that resulted from the generated dataset is shown. Referring to FIG. 3B, a heatmap of the synthetic data generated using data generation training application 122 is shown. Referring to FIG. 3C, a heatmap of the synthetic data generated using CTGAN is shown. Data generation training application 122 generated synthetic data that preserved the pairwise correlations between the 10 variables. In contrast, CTGAN failed to capture any pairwise correlation in the synthetic data.

Figure 3D:
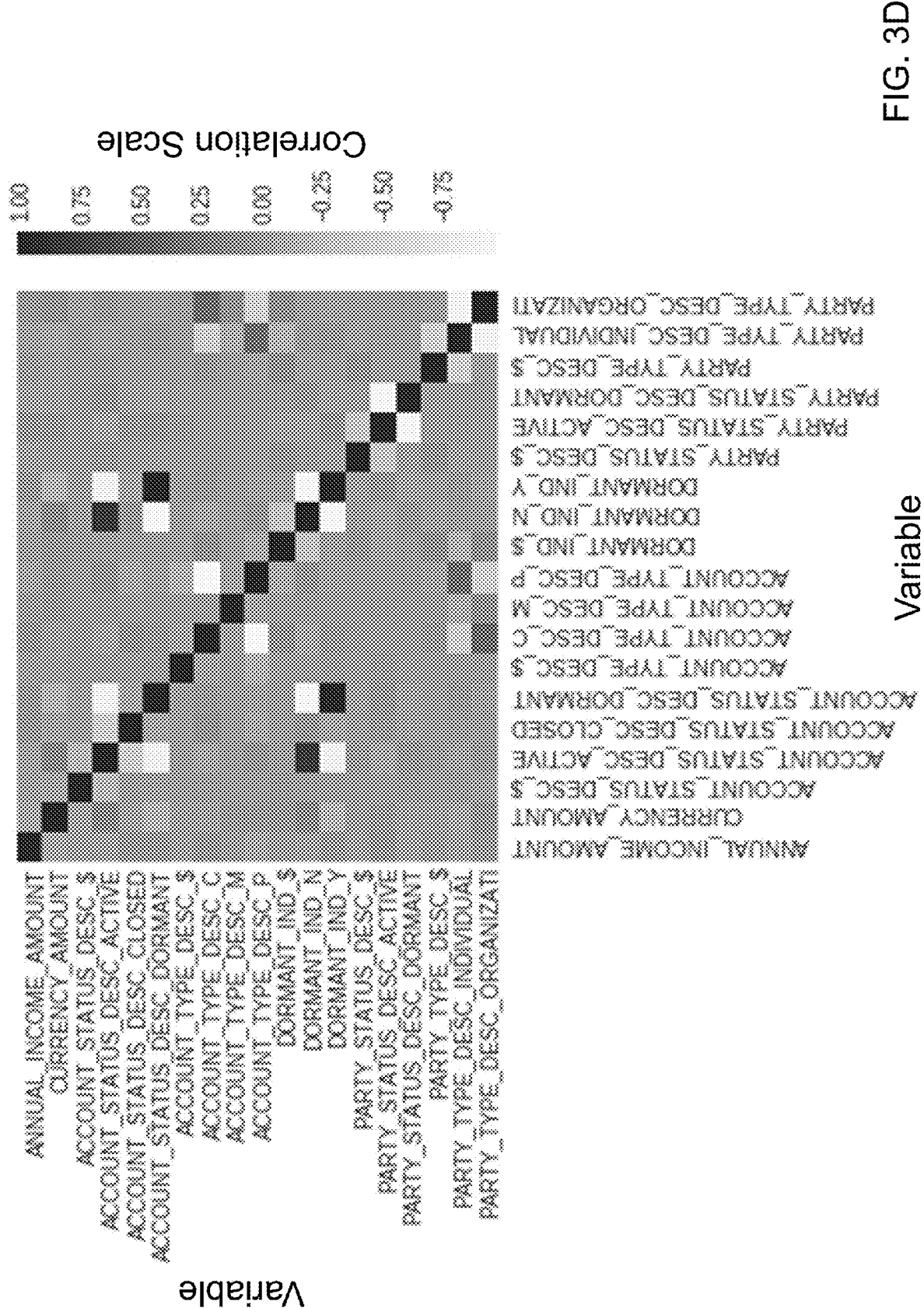
Figure 3E:
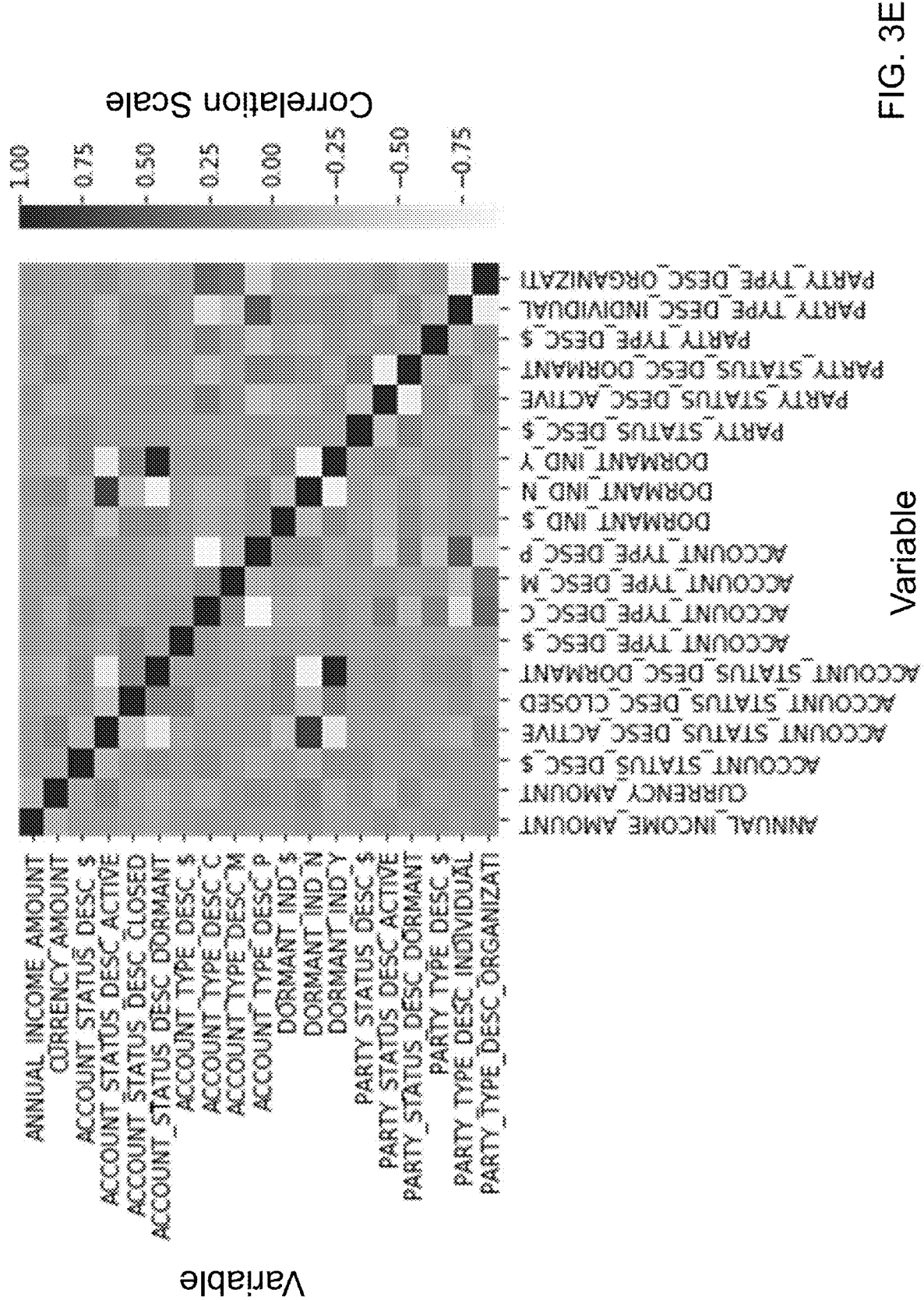

Customer due diligence is at the heart of anti-money laundering (AML) and is designed to help banks and financial institutions verify that customers are not on any prohibited lists and are properly risk-assessed. To assess the risk, companies collect personal information, including name, photographic ID, address, birth certificate, account data, and transaction data. The personal information is highly confidential. As a result, financial institutions and government agencies are very sensitive with regard to data sharing. However, without data sharing, it is difficult to develop and test AML solutions. The synthetic data generated by data generation training application 122 cannot typically be traced back to a specific person. Referring to FIG. 3D, a heatmap of the correlation matrix that resulted from the dataset is shown. Referring to FIG. 3E, a heatmap of the synthetic data generated using data generation training application 122 is shown. Data generation training application 122 generated synthetic data that preserved the pairwise correlations between the 19 lvariables. In contrast, CTGAN failed to capture any pairwise correlation in the synthetic data.

The efficacy associated with using the synthetic data generated by data generation training application 122 and CTGAN as training data for machine learning was also evaluated. An adaboost classifier from the sklearn toolkit was used. Table 1 below captures the comparative results.

TABLE 1

| | Precision(0) accuracy | Precision(1) accuracy | Recall(0) accuracy | Recall(1) accuracy | 1-Euclidean |
|---|---|---|---|---|---|
| CTGAN | 0.97 | 0.91 | 0.97 | 0.92 | 0.95668 |
| Data generation training application 122 | 0.99 | 0.94 | 0.98 | 0.96 | 0.99999 |

The precision and recall accuracy for events as 0 or 1 was used to evaluate the classification performance. The 1-Euclidean was used to measure a proximity between the synthetic and the real data. Data generation training application 122 and the existing method CTGAN perform similarly.

When input tabular data 124 does not include a target variable, an unsupervised evaluation framework can be applied using kernel density estimation and calculation of a log-likelihood value. A quality of the synthetic data can be evaluated using a likelihood ratio test performed by comparing a fit of synthetic tabular data 128 to input tabular data 124. Kernel density estimation is a non-parametric estimator of density. The kernel is a smooth function that specifies a shape of a distribution placed at each point, and a kernel bandwidth controls a size of the kernel at each point. Many different kernels may be used for kernel density estimation. The kernel density estimation fits the data by maximizing the likelihood.

The kernel density estimator may be defined using $\hat{f}_K(X)=\arg\max L_x(p)$. The log-likelihood function of $f$ is $$L(f) = \sum_{i=1}^{N} \log f(X_i) - N\left(\int f(u)du - 1\right).$$

The local log-likelihood at target value x is $$L(f) = \sum_{i=1}^{N} K\left(\frac{x-X_i}{h}\right)\log f(X_x) - N\int K\left(\frac{x-u}{h}\right)f(u)du,$$

where K indicates the kernel function, and h indicates a kernel parameter value defined for the kernel function. A test statistic is $$LR = -2\ln\left(\frac{L(m_1)}{L_{m_2}}\right) = 2(\log lik(m_2) - \log lik(m_1)),$$

where loglik indicates the log-likelihood computation. The likelihoods are calculated using the likelihood ratio test, which uses a chi-square test to reject a null hypothesis of the two distributions.

Figure 4:
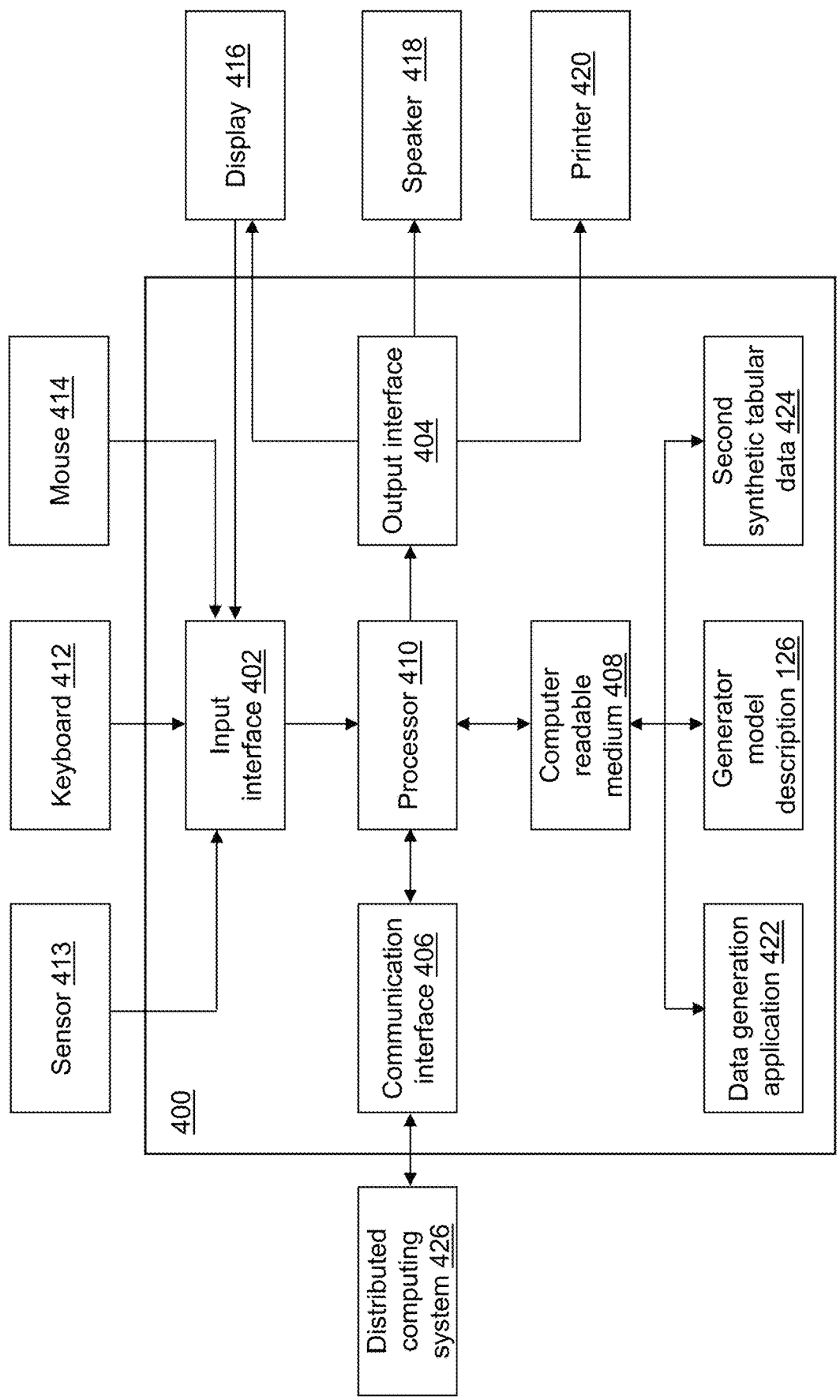
FIG. 4 depicts a block diagram of a data generation device in accordance with an illustrative embodiment.

Referring to FIG. 4, a block diagram of a data generation device 400 is shown in accordance with an illustrative embodiment. Data generation device 400 may include a second input interface 402, a second output interface 404, a second communication interface 406, a second non-transitory computer-readable medium 408, a second processor 410, a data generation application 422, second synthetic tabular data 424, decoder model description 126, and generator model description 126. Fewer, different, and/or additional components may be incorporated into data generation device 400. Data generation device 400 and data generation training device 100 may be the same or different devices.

Second input interface 402 provides the same or similar functionality as that described with reference to input interface 102 of data generation training device 100 though referring to data generation device 400. Second output interface 404 provides the same or similar functionality as that described with reference to output interface 104 of data generation training device 100 though referring to data generation device 400. Second communication interface 406 provides the same or similar functionality as that described with reference to communication interface 106 of data generation training device 100 though referring to data generation device 400. Data and messages may be transferred between data generation device 400 and a distributed computing system 426 using second communication interface 406. Distributed computing system 132 and distributed computing system 426 may be the same or different computing systems. Second computer-readable medium 408 provides the same or similar functionality as that described with reference to computer-readable medium 108 of data generation training device 100 though referring to data generation device 400. Second processor 410 provides the same or similar functionality as that described with reference to processor 110 of data generation training device 100 though referring to data generation device 400.

Data generation application 422 performs operations associated with generating data stored in second synthetic tabular data 424 using the decoder model description stored in decoder model description 126 and the generator model description stored in generator model description 126. Some or all of the operations described herein may be embodied in data generation application 422. The operations may be implemented using hardware, firmware, software, or any combination of these methods.

Referring to the example embodiment of FIG. 4, data generation application 422 is implemented in software (comprised of computer-readable and/or computer-executable instructions) stored in second computer-readable medium 408 and accessible by second processor 410 for execution of the instructions that embody the operations of data generation application 422. Data generation application 422 may be written using one or more programming languages, assembly languages, scripting languages, etc. Similar to data generation training application 122, data generation application 422 may be integrated with other analytic tools. Data generation application 422 and data generation training application 122 may be the same or different applications that are integrated in various manners to generate synthetic data for use in training a machine learning model. Data generation application 422 may be implemented as a Web application.

Figure 5:
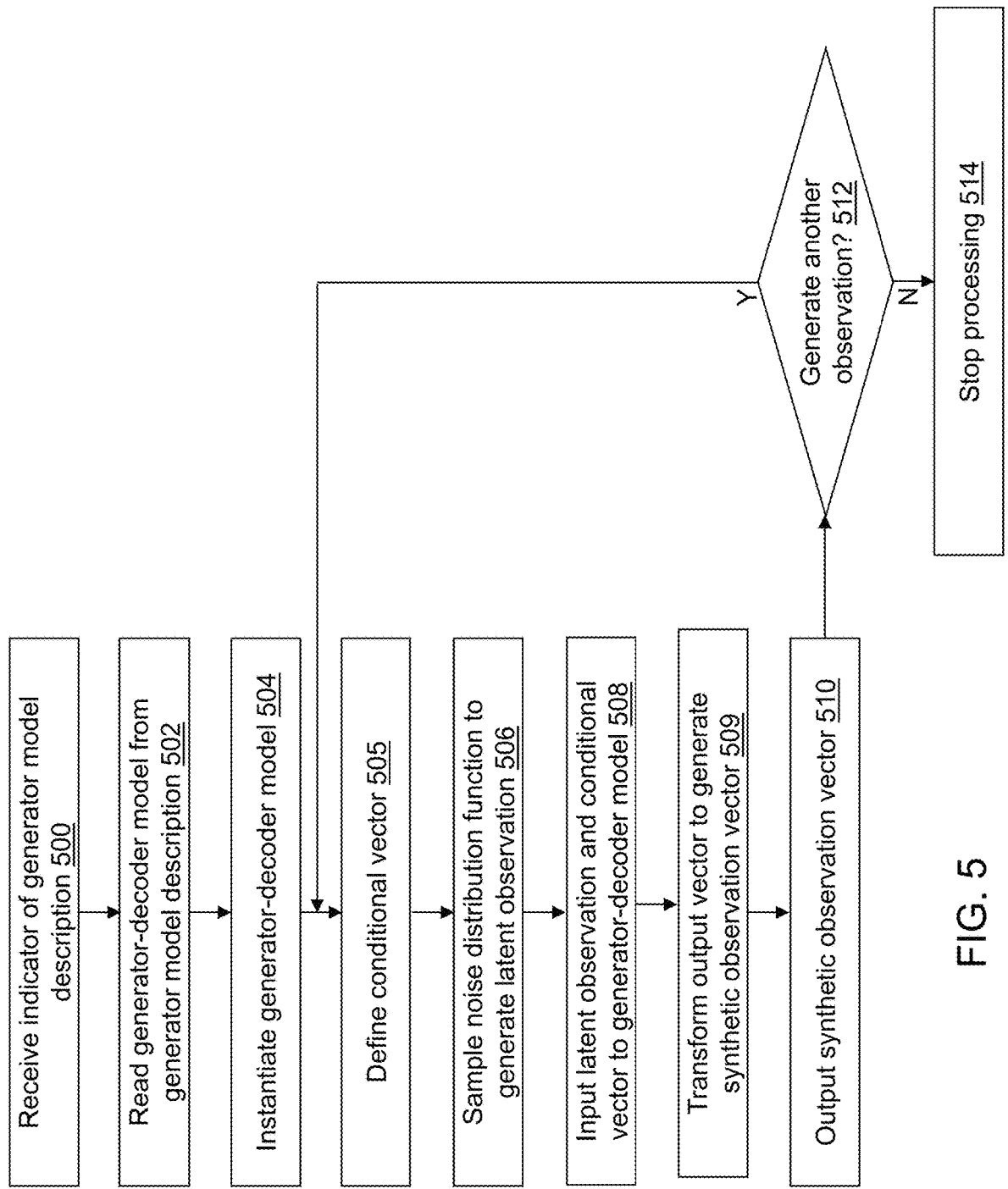
FIG. 5 depicts a flow diagram illustrating examples of operations performed by a data generation application of the data generation device of FIG. 4 in accordance with an illustrative embodiment.

Referring to FIG. 5, example operations of data generation application 422 are described to generate new tabular data. Additional, fewer, or different operations may be performed depending on the embodiment of data generation application 422. The order of presentation of the operations of FIG. 5 is not intended to be limiting. Although some of the operational flows are presented in sequence, the various operations may be performed in various repetitions, concurrently (in parallel, for example, using threads and/or distributed computing system 426), and/or in other orders than those that are illustrated.

In an operation 500, an eleventh indicator may be received that indicates generator model description 126. For example, the eleventh indicator indicates a location and a name of generator model description 126. As an example, the eleventh indicator may be received by data generation application 422 after selection from a user interface window or after entry by a user into a user interface window. In an alternative embodiment, generator model description 126 may not be selectable. For example, a most recently created model configuration data may be used automatically. As another example, generator model description 126 may be provided automatically as part of integration with data generation training application 122.

In an operation 502, a generator-decoder model description may be read from generator model description 126 that includes the decoder model of the trained AE model, and the noise distribution function may be read from generator model description 126. In an alternative embodiment, the noise distribution function may be read from a different file or otherwise provided to data generation application 422.

In an operation 504, a generator-decoder model is instantiated with the generator-decoder model description. For example, the architecture of the generator model and the decoder model, the hyperparameters, the weight vector, and other characterizing elements are read and used to instantiate the generator-decoder model based on the information output from the training process in operation 284.

Similar to operation 234, in an operation 505, a conditional vector cond is defined. For example, $N_d$ zero-filled mask vectors $M_i = [M_i^{(k)}]_{k=1, \ldots, |D_i|}$, $i=1, \ldots, N_d$ are defined. A variable index value i* between one and $N_d$ is randomly selected with equal probability of selecting each value between one and $N_d$. A variable value k* between one and $|D|$ is randomly selected using $PMF_{i*}$ for the $i*^{th}$ discrete variable that may be read from generator model description 126. The $k*^{th}$ component of $M_{i*}$ is set to one, or $M_{i*}^{(k*)}=1$. The conditional vector is defined using $cond_j = M_1 \oplus \ldots \oplus M_{N_d}$. In an alternative embodiment, $PMF_i$, $i=1, \ldots, N_d$ may be read from a different file or otherwise provided to data generation application 422 or otherwise provided to data generation application 422.

In an operation 506, a latent observation vector is generated using the noise distribution function.

In an operation 508, the latent observation vector and the conditional vector are input to the instantiated generator-decoder model to generate an output observation vector.

In an operation 509, the output observation vector is transformed to generate a synthetic observation vector. For example, similar to operation 284, mode k is defined based on an index to the value that is non-zero in $\beta_i$, $i=1, \ldots, N_c$ and used to compute the continuous value as $c_i = 4\phi_k \alpha_i + \eta_k$, $i=1, \ldots, N_c$. For each discrete variable, the one-hot vector representation $d_i$, $i=1, \ldots, N_d$ is used to define the discrete value using the lookup table. The values for $\eta_k$ and $\phi_k$ and the lookup table may be read from generator model description 126 or another stored location or otherwise provided to data generation application 422.

In an operation 510, the synthetic observation vector may be output, for example, by storing the synthetic observation vector to second synthetic tabular data 424. In addition, or in the alternative, the synthetic observation vector may be presented on a second display 416, printed on a second printer 420, sent to another computing device using second communication interface 406, etc.

In an operation 512, a determination is made concerning whether another synthetic observation vector is to be generated. When another synthetic observation vector is to be generated, processing continues in operation 506. When synthetic observation vector generation is done, processing continues in an operation 514. For example, a predefined number of synthetic observation vectors may be generated.

In operation 514, processing stops.

Figure 6:
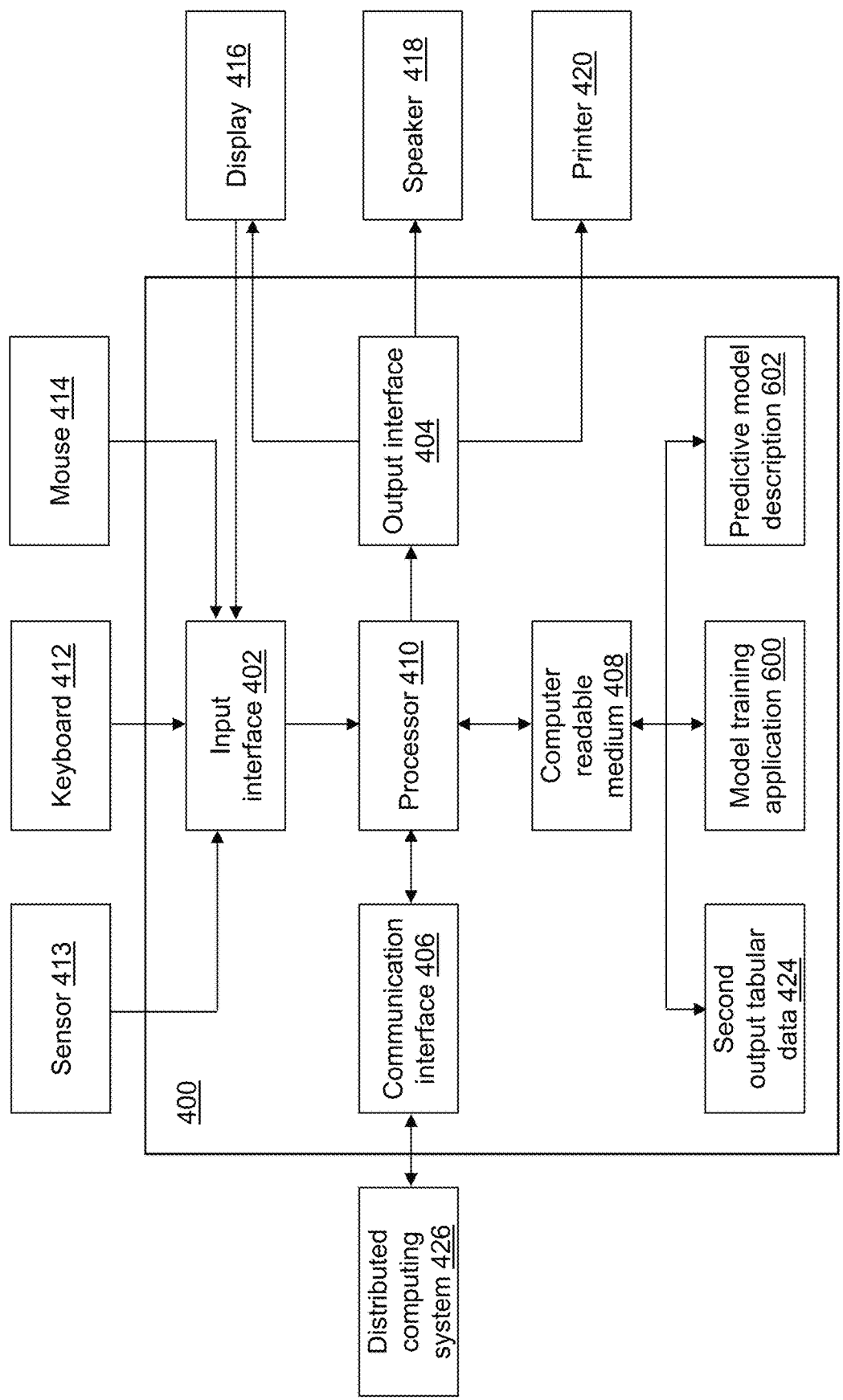
FIG. 6 depicts a block diagram of a model training device in accordance with an illustrative embodiment.

Referring to FIG. 6, data generation device 400 may further include a model training application 600 and a predictive model description 602.

Figure 7:
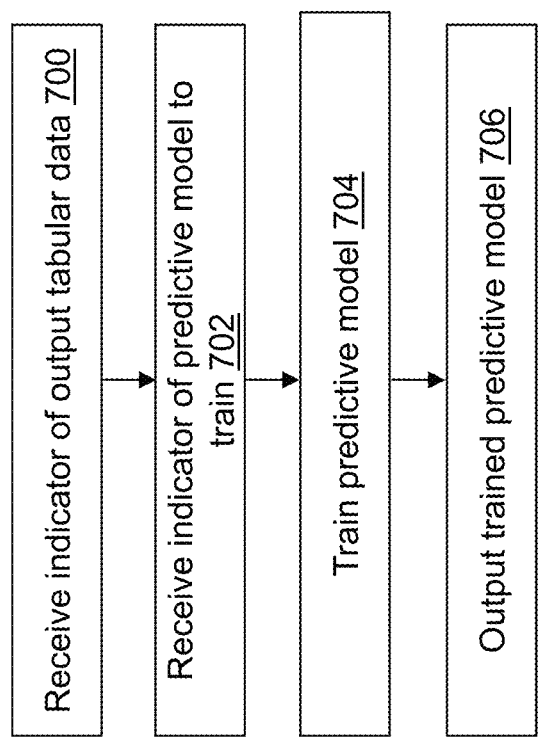
FIG. 7 depicts a flow diagram illustrating examples of operations performed by a model training application of the model training device of FIG. 6 in accordance with an illustrative embodiment.

Referring to FIG. 7, example operations of model training application 600 are described to train a machine learning model using the synthetic observation vectors stored in synthetic tabular data 128 and/or second synthetic tabular data 424.

In an operation 700, a twelfth indicator may be received that indicates synthetic tabular data 128 and/or second synthetic tabular data 424. For example, the twelfth indicator indicates a location and a name of synthetic tabular data 128 and/or second synthetic tabular data 424. As an example, twelfth eleventh indicator may be received by model training application 600 after selection from a user interface window or after entry by a user into a user interface window. In an alternative embodiment, synthetic tabular data 128 and/or second synthetic tabular data 424 may not be selectable. For example, a most recently created dataset may be used automatically. As another example, synthetic tabular data 128 and/or second synthetic tabular data 424 may be provided automatically as part of integration with data generation training application 122.

In operation 702, a thirteenth indicator indicates a model type. For example, the thirteenth indicator indicates a name of a model type that performs prediction and/or classification. The thirteenth indicator may be received by model training application 600 from a user interface window or after entry by a user into a user interface window. A default value for the model type may further be stored, for example, in second computer-readable medium 408. As an example, a model type may be selected from "SVM", "K-Cluster", "Neural Network", "Logistic Regression", "Forest", "Gradient Boosting", "Decision Tree", "Factorization Machine", etc. The model type indicated by "SVM" may refer to a support vector machine (SVM) model type. The model type indicated by "K-Cluster" may refer to a k-means clustering model type. The model type indicated by "Neural Network" may refer to a neural network model type. The model type indicated by "Logistic Regression" may refer to a logistic regression model type. The model type indicated by "Forest" may refer to a random forest model type. The model type indicated by "Gradient Boosting" may refer to a gradient boosting model type. The model type indicated by "Decision Tree" may refer to a decision tree model type. The model type indicated by "Factorization Machine" may refer to a factorization machine model type. For example, a default model type may be indicated by "Forest". Of course, the model type may be labeled or selected in a variety of different manners by the user as understood by a person of skill in the art. In an alternative embodiment, the model type may not be selectable, and a single model type is implemented by model training application 600. For example, the model type indicated as "Forest" may be used by default or without allowing a selection.

One or more hyperparameters to use for training and validating the indicated model type and/or specified values for an automatic tuning method (autotune option) may also be indicated using the fourteenth indicator. Hyperparameters define values or various options that govern a training process based on the model type. The default values of these hyperparameters may not be suitable for all applications. To reduce the effort in adjusting these hyperparameters, an automatic tuning process may be used to identify the best settings for the hyperparameters though the hyperparameters may optionally be selected as an input option by a user.

In an operation 704, a model is trained using each observation vector read from synthetic tabular data 128 and/or second synthetic tabular data 424 based on the model type and the hyperparameters indicated in operation 702. For example, the model may be trained and validated using another application that is distinct from model training application 600 or is integrated with model training application 600. For illustration, a TREESPLIT Procedure included in SAS® Visual Data Mining and Machine Learning 8.1: Statistical Procedures developed and provided by SAS Institute Inc. of Cary, N.C., USA may be used for a decision tree model type; a FACTMAC procedure included in SAS® Visual Data Mining and Machine Learning 8.1: Data Mining and Machine Learning Procedures developed and provided by SAS Institute Inc. of Cary, N.C., USA may be used for a factorization machine model type; a FOREST procedure included in SAS® Visual Data Mining and Machine Learning 8.1: Data Mining and Machine Learning Procedures developed and provided by SAS Institute Inc. of Cary, N.C., USA may be used for a random forest model type; a GRADBOOST procedure included in SAS® Visual Data Mining and Machine Learning 8.1: Data Mining and Machine Learning Procedures developed and provided by SAS Institute Inc. of Cary, N.C., USA may be used for a gradient boosting model type; a NNET procedure included in SAS® Visual Data Mining and Machine Learning 8.1: Data Mining and Machine Learning Procedures developed and provided by SAS Institute Inc. of Cary, N.C., USA may be used for a gradient boosting model type; a SVMACHINE procedure included in SAS® Visual Data Mining and Machine Learning 8.1: Data Mining and Machine Learning Procedures developed and provided by SAS Institute Inc. of Cary, N.C., USA may be used for a support vector machine model type; a HPLOGISTIC procedure included in SAS/STAT® 15.1 developed and provided by SAS Institute Inc. of Cary, N.C., USA may be used for a logistic regression model type; a KCLUS procedure included in SAS® Visual Data Mining and Machine Learning 8.1: Statistical Procedures developed and provided by SAS Institute Inc. of Cary, N.C., USA may be used for a k-means clustering model type; etc.

In an operation 706, the data that describes the trained model is stored in predictive model description 602. For illustration, the trained model may be stored using the ASTORE procedure provided by SAS® Visual Data Mining and Machine Learning software.

Figure 8:
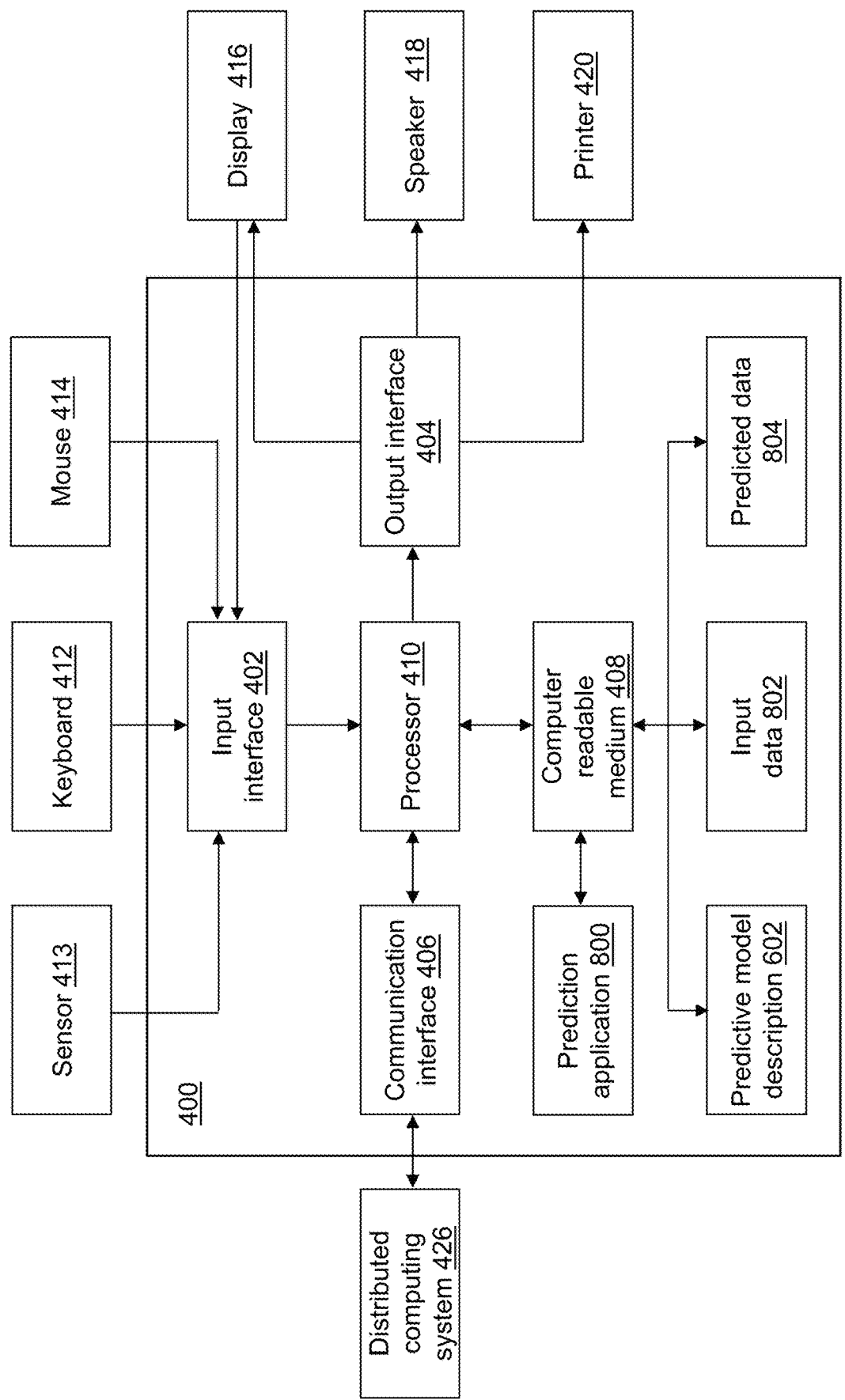
FIG. 8 depicts a block diagram of a prediction device in accordance with an illustrative embodiment.

Referring to FIG. 8, data generation device 400 may further include a prediction application 800, input data 802, and predicted data 804.

Input tabular data 124 and input data 802 may be generated, stored, and accessed using the same or different mechanisms. Similar to input tabular data 124, input data 802 may include a plurality of rows and a plurality of columns with the plurality of rows referred to as observations or records, and the columns referred to as variables that are associated with an observation. Input data 802 may be transposed.

Similar to input tabular data 124, input data 802 may be stored on second computer-readable medium 408 or on one or more computer-readable media of distributed computing system 426 and accessed by data generation device 400 using second communication interface 406. Data stored in input data 802 may be a sensor measurement or a data communication value, for example, from a sensor 413, may be generated or captured in response to occurrence of an event or a transaction, generated by a device such as in response to an interaction by a user with the device, for example, from a second keyboard 412 or a second mouse 414, etc. The data stored in input data 802 may include any type of content represented in any computer-readable format such as binary, alphanumeric, numeric, string, markup language, etc. The content may include textual information, numeric information, etc. that further may be encoded using various encoding techniques as understood by a person of skill in the art. The data stored in input data 802 may be captured at different time points, periodically, intermittently, when an event occurs, etc. One or more columns may include a time value. Similar to input tabular data 124, data stored in input data 802 may be generated as part of the IoT, and some or all data may be pre- or post-processed by an ESPE.

Similar to input tabular data 124, input data 802 may be stored in various compressed formats such as a coordinate format, a compressed sparse column format, a compressed sparse row format, etc. Input data 802 further may be stored using various structures as known to those skilled in the art including a file system, a relational database, a system of tables, a structured query language database, etc. on data generation device 400 and/or on distributed computing system 426. Data generation device 400 may coordinate access to input data 802 that is distributed across a plurality of computing devices that make up distributed computing system 426. For example, input data 802 may be stored in a cube distributed across a grid of computers as understood by a person of skill in the art. As another example, input data 802 may be stored in a multi-node Hadoop® cluster. As another example, input data 802 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in input data 802.

Figure 9:
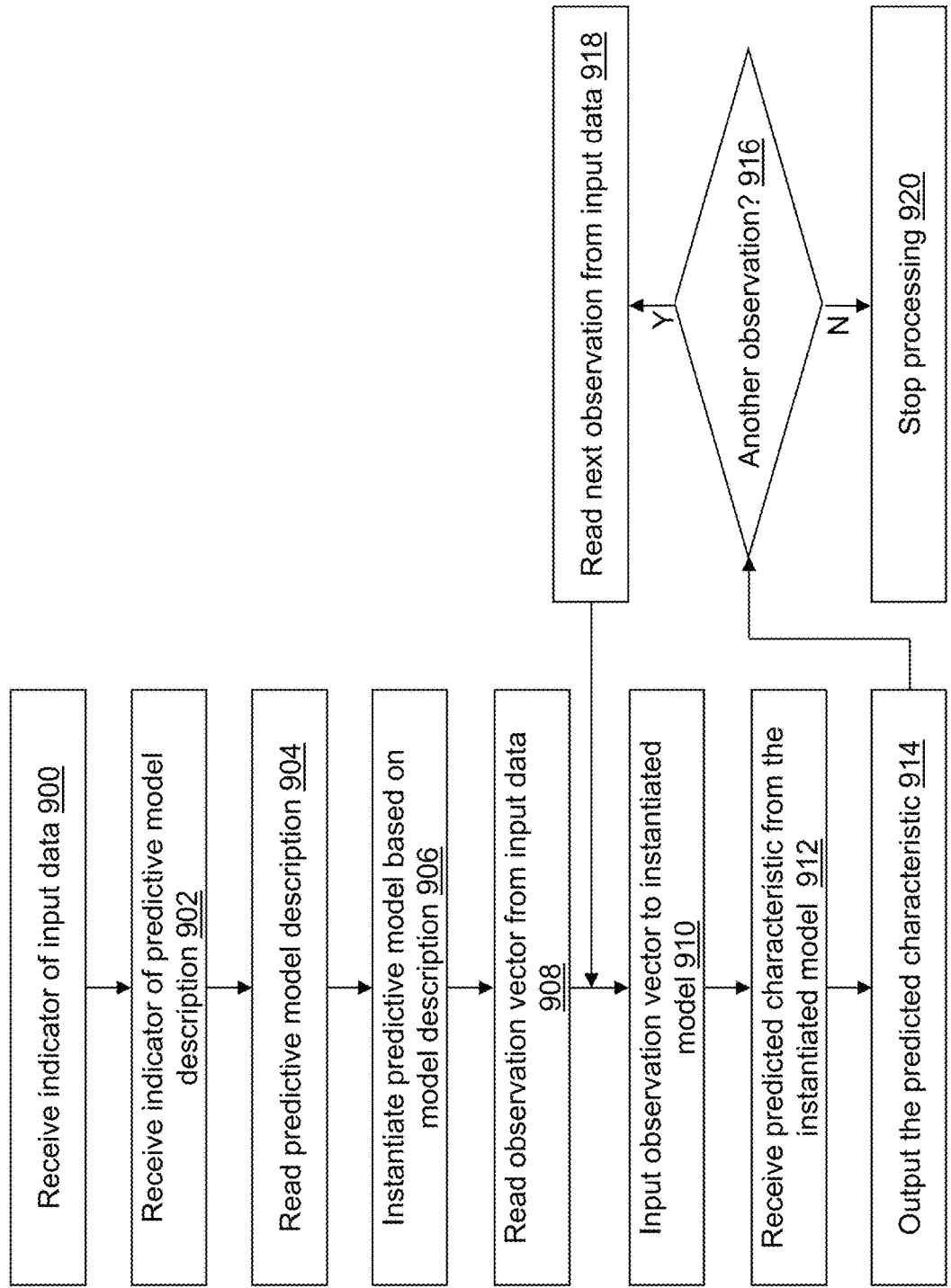
FIG. 9 depicts a flow diagram illustrating examples of operations performed by a prediction of the prediction device of FIG. 8 in accordance with an illustrative embodiment.

Referring to FIG. 9, example operations of prediction application 800 are described to use the trained machine learning model to predict a characteristic for each observation vector included in input data 802.

In an operation 900, a fourteenth indicator may be received that indicates input data 802. For example, the fourteenth indicator indicates a location and a name of input data 802. As an example, fourteenth eleventh indicator may be received by prediction application 800 after selection from a user interface window or after entry by a user into a user interface window. In an alternative embodiment, input data 802 may not be selectable. For example, a most recently created dataset may be used automatically.

In an operation 902, a fifteenth indicator may be received that indicates predictive model description 602. For example, the fifteenth indicator indicates a location and a name of predictive model description 602. As an example, the fifteenth indicator may be received by prediction application 800 after selection from a user interface window or after entry by a user into a user interface window. In an alternative embodiment, predictive model description 602 may not be selectable. For example, a most recently created model configuration data may be used automatically. As another example, predictive model description 602 may be provided automatically as part of integration with model training application 600.

In an operation 904, a predictive model description may be read from predictive model description 602.

In an operation 906, a predictive model is instantiated with the predictive model description.

In an operation 908, an observation vector is read from input data 802.

In an operation 910, the observation vector is input to the instantiated predictive model to predict a characteristic of the observation vector.

In an operation 912, a predicted characteristic value for the read observation vector is received as an output of the instantiated model. The output may include a probability that the observation vector has one or more different possible characteristic values.

In an operation 914, the predicted characteristic value may be output, for example, by storing the predicted characteristic value with the observation vector to predicted data 804. In addition, or in the alternative, the predicted characteristic value may be presented on a second display 416, printed on a second printer 420, sent to another computing device using second communication interface 406, an alarm or other alert signal may be sounded through a second speaker 418, etc.

In an operation 916, a determination is made concerning whether or not input data 802 includes another observation vector. When input data 802 includes another observation vector, processing continues in an operation 918. When input data 802 does not include another observation vector, processing continues in an operation 920.

In operation 918, a next observation vector is read from input data 802, and processing continues in operation 910.

In operation 920, processing stops and cleanup is performed as needed.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
(A) define a plurality of conditional vectors, wherein the plurality of conditional vectors includes a predefined number of vectors, wherein each conditional vector of the plurality of conditional vectors includes a vector defined for each discrete variable of a plurality of variables;
(B) generate a plurality of latent observation vectors using a predefined noise distribution function, wherein the plurality of latent observation vectors includes the predefined number of vectors, wherein each latent observation vector of the plurality of latent observation vectors includes a first value for each variable of the plurality of variables;

(C) execute a forward propagation of a generator model with the defined plurality of conditional vectors and the generated plurality of latent observation vectors as input to generate an output vector;

(D) execute a forward propagation of a decoder model of a trained autoencoder model with the generated output vector as input to generate a plurality of decoded vectors, wherein the plurality of decoded vectors includes the predefined number of vectors;

(E) select a plurality of transformed observation vectors from transformed data based on the defined plurality of conditional vectors, wherein the plurality of transformed observation vectors includes the predefined number of vectors, wherein each transformed observation vector of the plurality of transformed observation vectors is a transformation of a respective observation vector of a plurality of observation vectors included in an input dataset, wherein each observation vector of the plurality of observation vectors includes a second value for each variable of the plurality of variables;

(F) execute a forward propagation of a discriminator model with the selected plurality of transformed observation vectors, the defined plurality of conditional vectors, and the generated plurality of decoded vectors as input to predict whether each of the selected plurality of transformed observation vectors and the generated plurality of decoded vectors is real or fake;

(G) compute a discriminator model loss value based on whether the prediction for each of the selected plurality of transformed observation vectors and the generated plurality of decoded vectors is correct;

(H) update the discriminator model using the computed discriminator model loss value;

(I) compute a generator model loss value based on whether the prediction for each of the plurality of transformed observation vectors and the generated plurality of decoded vectors is correct;

(J) update the generator model using the computed generator model loss value;

repeat (A) through (J) until a convergence parameter value indicates that training of the generator model is complete; and output a description of the generator model and the decoder model of the trained autoencoder model as a trained generator model.

2. The non-transitory computer-readable medium of claim 1, wherein variable values for each respective variable of the plurality of variables are defined in a distinct column of an input dataset, wherein the plurality of observation vectors are stored in the input dataset.

3. The non-transitory computer-readable medium of claim 2, wherein the input dataset is distributed across a plurality of computing devices.

4. The non-transitory computer-readable medium of claim 2, wherein the input dataset is a table that includes each distinct column and a row for each observation vector of the plurality of observation vectors.

5. The non-transitory computer-readable medium of claim 1, wherein the generator model includes a first plurality of neural network layers.

6. The non-transitory computer-readable medium of claim 5, wherein the input to the generator model is a concatenation of the defined plurality of conditional vectors and the generated plurality of latent observation vectors.

7. The non-transitory computer-readable medium of claim 6, wherein the output vector is generated from application of a linear transformation layer from an input dimension defined by the concatenation of the defined plurality of conditional vectors and the generated plurality of latent observation vectors to a predefined output dimension, application of a batch normalization activation function layer, application of a rectified linear activation function layer, and application of a hyperbolic tangent activation function layer.

8. The non-transitory computer-readable medium of claim 7, wherein the decoder model includes a plurality of fully-connected neural network layers, wherein an input layer of the decoder model accepts the output vector defined based on the predefined output dimension.

9. The non-transitory computer-readable medium of claim 8, wherein each decoded vector of the generated plurality of decoded vectors includes a probability density value and a mode vector defined for each continuous variable of the plurality of variables and a one-hot vector representation of each discrete variable of the plurality of variables.

10. The non-transitory computer-readable medium of claim 9, wherein the discriminator model includes a third plurality of neural network layers, wherein an output layer of the third plurality of neural network layers assigns a label that indicates whether each of the plurality of transformed observation vectors and the generated plurality of decoded vectors is real or fake.

11. The non-transitory computer-readable medium of claim 10, wherein the discriminator model loss value is computed by providing the plurality of transformed observation vectors and the defined plurality of conditional vectors to the input layer of the discriminator model and by separately providing the generated plurality of decoded vectors and the defined plurality of conditional vectors to the input layer of the discriminator model.

12. The non-transitory computer-readable medium of claim 5, wherein the forward propagation of the generator model executes the generator model using current weight values defined for each node of each layer of the first plurality of neural network layers.

13. The non-transitory computer-readable medium of claim 12, wherein the update of the generator model computes new weight values for each node of each layer of the first plurality of neural network layers.

14. The non-transitory computer-readable medium of claim 1, wherein the convergence parameter value is a number of iterations of (J) and indicates that training of the training of the generator model is complete based on the number of iterations of (J) exceeding a predefined maximum number of iterations.

15. The non-transitory computer-readable medium of claim 1, wherein the convergence parameter value is a loss value computed from the computed discriminator loss value and the computed generator model loss value and indicates that training of the generator model is complete based on the convergence parameter value being less than or equal to a predefined convergence value.

16. The non-transitory computer-readable medium of claim 15, wherein the convergence parameter value further includes a gradient penalty loss value computed before (H) and after (F) by executing the forward propagation of the discriminator model with weighted vectors and the defined plurality of conditional vectors, wherein the weighted vectors are computed from the plurality of transformed observation vectors and the generated plurality of decoded vectors.

17. The non-transitory computer-readable medium of claim 1, wherein, after training of the generator model is complete, the computer-readable instructions further cause the computing device to:
(K) define a conditional vector that includes the vector defined for each discrete variable of the plurality of variables;
(L) generate a latent observation vector using the predefined noise distribution function, wherein the latent observation includes a third value for each variable of the plurality of variables;
(M) execute the trained generator model with the defined conditional vector and the generated latent observation vector as input to generate a second output vector;
(N) execute the decoder model of the trained autoencoder model with the second output vector as input to generate a fake output vector;
(O) transform the generated fake output vector from an output space defined by the generated plurality of decoded vectors to an input space defined by the plurality of observation vectors; and
(P) output the transformed, generated fake output vector.

18. The non-transitory computer-readable medium of claim 17, wherein the transformed, generated fake output vector includes a fourth value for each variable of the plurality of variables.

19. The non-transitory computer-readable medium of claim 17, wherein the computer-readable instructions further cause the computing device to repeat (K) through (P) a plurality of times to create a synthetic dataset that includes each transformed, generated fake output vector output in (P).

20. The non-transitory computer-readable medium of claim 19, wherein the computer-readable instructions further cause the computing device to train a machine learning model with the synthetic dataset.

21. The non-transitory computer-readable medium of claim 20, wherein the computer-readable instructions further cause the computing device to:
read a new observation vector from a dataset;
input the read new observation vector to the trained machine learning model to predict a characteristic value of the read new observation vector; and
output the predicted characteristic value.

22. The non-transitory computer-readable medium of claim 1, wherein the computer-readable instructions further cause the computing device to:
transform the generated plurality of decoded vectors from an output space defined by the generated plurality of decoded vectors to an input space defined by the plurality of observation vectors; and
output the transformed, generated plurality of decoded vectors.

23. The non-transitory computer-readable medium of claim 22, wherein each decoded vector of the generated plurality of decoded vectors includes a probability density value and a mode vector defined for each continuous variable of the plurality of variables and a one-hot vector representation of each discrete variable of the plurality of variables, wherein the probability density value and the mode vector defined for each continuous variable of the plurality of variables and the one-hot vector representation of each discrete variable of the plurality of variables define the output space.

24. The non-transitory computer-readable medium of claim 1, wherein each transformed observation vector of the plurality of transformed observation vectors includes a probability density value and a mode vector defined for each continuous variable of the plurality of variables and a one-hot vector representation of each discrete variable of the plurality of variables.

25. The non-transitory computer-readable medium of claim 1, wherein each transformed observation vector of the plurality of transformed observation vectors is selected from the input dataset based on a respective conditional vector of the plurality of conditional vectors.

26. The non-transitory computer-readable medium of claim 1, wherein, before (A), the computer-readable instructions further cause the computing device to:
transform the plurality of observation vectors to define the plurality of transformed observation vectors; and
train the autoencoder model with the plurality of transformed observation vectors.

27. The non-transitory computer-readable medium of claim 26, wherein, transforming the plurality of observation vectors comprises:
computing a mode vector for each continuous variable of the plurality of variables from the plurality of observation vectors;
computing a probability density value for each continuous variable of the plurality of variables from the plurality of observation vectors; and
defining a one-hot vector representation vector for each discrete variable of the plurality of variables from the plurality of observation vectors.

28. The non-transitory computer-readable medium of claim 27, wherein each conditional vector of the plurality of conditional vectors includes a value in a single position of the respective conditional vector that is associated with a specific value for one of the discrete variables, wherein each transformed observation vector of the plurality of transformed observation vectors is selected from the input dataset based on the specific value.

29. A computing device comprising:
a processor; and
a non-transitory computer-readable medium operably coupled to the processor, the computer-readable medium having computer-readable instructions stored thereon that, when executed by the processor, cause the computing device to
(A) define a plurality of conditional vectors, wherein the plurality of conditional vectors includes a predefined number of vectors, wherein each conditional vector of the plurality of conditional vectors includes a vector defined for each discrete variable of a plurality of variables;
(B) generate a plurality of latent observation vectors using a predefined noise distribution function, wherein the plurality of latent observation vectors includes the predefined number of vectors, wherein each latent observation vector of the plurality of latent observation vectors includes a first value for each variable of the plurality of variables;
(C) execute a forward propagation of a generator model with the defined plurality of conditional vectors and the generated plurality of latent observation vectors as input to generate an output vector;
(D) execute a forward propagation of a decoder model of a trained autoencoder model with the generated output vector as input to generate a plurality of decoded vectors, wherein the plurality of decoded vectors includes the predefined number of vectors;
(E) select a plurality of transformed observation vectors from transformed data based on the defined plurality of conditional vectors, wherein the plurality of transformed observation vectors includes the predefined number of vectors, wherein each transformed observation vector of the plurality of transformed observation vectors is a transformation of a respective observation vector of a plurality of observation vectors included in an input dataset, wherein each observation vector of the plurality of observation vectors includes a second value for each variable of the plurality of variables;
- (F) execute a forward propagation of a discriminator model with the selected plurality of transformed observation vectors, the defined plurality of conditional vectors, and the generated plurality of decoded vectors as input to predict whether each of the selected plurality of transformed observation vectors and the generated plurality of decoded vectors is real or fake;
- (G) compute a discriminator model loss value based on whether the prediction for each of the selected plurality of transformed observation vectors and the generated plurality of decoded vectors is correct;
- (H) update the discriminator model using the computed discriminator model loss value;
- (I) compute a generator model loss value based on whether the prediction for each of the plurality of transformed observation vectors and the generated plurality of decoded vectors is correct;
- (J) update the generator model using the computed generator model loss value;
- repeat (A) through (J) until a convergence parameter value indicates that training of the generator model is complete; and
- output a description of the generator model and the decoder model of the trained autoencoder model as a trained generator model.

30. A method of generating synthetic tabular data for use in training a machine learning model, the method comprising:
- (A) defining, by a computing device, a plurality of conditional vectors, wherein the plurality of conditional vectors includes a predefined number of vectors, wherein each conditional vector of the plurality of conditional vectors includes a vector defined for each discrete variable of a plurality of variables;
- (B) generating, by the computing device, a plurality of latent observation vectors using a predefined noise distribution function, wherein the plurality of latent observation vectors includes the predefined number of vectors, wherein each latent observation vector of the plurality of latent observation vectors includes a first value for each variable of the plurality of variables;
- (C) executing, by the computing device a forward propagation of a generator model with the defined plurality of conditional vectors and the generated plurality of latent observation vectors as input to generate an output vector;
- (D) executing, by the computing device, a forward propagation of a decoder model of a trained autoencoder model with the generated output vector as input to generate a plurality of decoded vectors, wherein the plurality of decoded vectors includes the predefined number of vectors;
- (E) selecting, by the computing device, a plurality of transformed observation vectors from transformed data based on the defined plurality of conditional vectors, wherein the plurality of transformed observation vectors includes the predefined number of vectors, wherein each transformed observation vector of the plurality of transformed observation vectors is a transformation of a respective observation vector of a plurality of observation vectors included in an input dataset, wherein each observation vector of the plurality of observation vectors includes a second value for each variable of the plurality of variables;
- (F) executing, by the computing device, a forward propagation of a discriminator model with the selected plurality of transformed observation vectors, the defined plurality of conditional vectors, and the generated plurality of decoded vectors as input to predict whether each of the selected plurality of transformed observation vectors and the generated plurality of decoded vectors is real or fake;
- (G) computing, by the computing device, a discriminator model loss value based on whether the prediction for each of the selected plurality of transformed observation vectors and the generated plurality of decoded vectors is correct;
- (H) updating, by the computing device, the discriminator model using the computed discriminator model loss value;
- (I) computing, by the computing device, a generator model loss value based on whether the prediction for each of the plurality of transformed observation vectors and the generated plurality of decoded vectors is correct;
- (J) updating, by the computing device, the generator model using the computed generator model loss value;
- repeating, by the computing device, (A) through (J) until a convergence parameter value indicates that training of the generator model is complete; and
- outputting, by the computing device, a description of the generator model and the decoder model of the trained autoencoder model as a trained generator model.

* * * * *

UNITED STATES PATENT AND TRADEMARK OFFICE
CERTIFICATE OF CORRECTION

| | |
|---|---|
| PATENT NO. | : 11,436,438 B1 |
| APPLICATION NO. | : 17/559735 |
| DATED | : September 6, 2022 |
| INVENTOR(S) | : Ruiwen Zhang et al. |

It is certified that error appears in the above-identified patent and that said Letters Patent is hereby corrected as shown below:

In the Specification

Column 18, Line 60:
Delete the phrase "transform the defined" and replace with --transform the $\hat{r}_j$ defined--.

Column 19, Line 60:
Delete the phrase "19 lvariables." and replace with --19 variables.--.

Signed and Sealed this
Seventh Day of February, 2023

Katherine Kelly Vidal
*Director of the United States Patent and Trademark Office*